(12) United States Patent
Zhao et al.

(10) Patent No.: US 12,557,851 B2
(45) Date of Patent: Feb. 24, 2026

(54) BATTERY ROD AND ELECTRONIC VAPORIZATION DEVICE

(71) Applicant: SHENZHEN SMOORE TECHNOLOGY LIMITED, Guangdong (CN)

(72) Inventors: Bosong Zhao, Shenzhen (CN); Wenjie Dong, Shenzhen (CN); Qingliang Zhou, Shenzhen (CN); Weiming Fang, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 415 days.

(21) Appl. No.: 18/188,354

(22) Filed: Mar. 22, 2023

(65) Prior Publication Data

US 2023/0248069 A1 Aug. 10, 2023

Related U.S. Application Data

(63) Continuation of application No. PCT/CN2020/117849, filed on Sep. 25, 2020.

(51) Int. Cl.
*A24F 40/53* (2020.01)
*A24F 40/40* (2020.01)
(Continued)

(52) U.S. Cl.
CPC .............. *A24F 40/53* (2020.01); *A24F 40/40* (2020.01); *H01M 10/4264* (2013.01);
(Continued)

(58) Field of Classification Search
CPC .... A24F 40/53; A24F 40/40; H01M 10/4264; H01M 2220/30; H01M 50/247; H02J 7/0063; H02J 2207/50
See application file for complete search history.

(56) References Cited

U.S. PATENT DOCUMENTS 9,155,848 B2    10/2015    Emarlou
2011/0277764 A1    11/2011    Terry et al.
(Continued)

FOREIGN PATENT DOCUMENTS

CN    101756352 A    6/2010
CN    103230099 A    8/2013
(Continued)

OTHER PUBLICATIONS

Chinese Patent Office, Office Action in Chinese Patent Application No. 202011024478.X (May 26, 2023).
(Continued)

*Primary Examiner* — Metasebia T Retebo
(74) *Attorney, Agent, or Firm* — Leydig, Voit & Mayer, Ltd.

(57) ABSTRACT

A battery rod for driving a vaporizer inserted therein includes: a driving chip; and a driving identification circuit connected to the driving chip. When the vaporizer is inserted in the battery rod, the driving chip determines that the vaporizer is forwardly inserted or reversely inserted through the driving identification circuit and controls the driving identification circuit to operate in a forward insertion mode or a reverse insertion mode.

20 Claims, 9 Drawing Sheets

(51) Int. Cl.
    *H01M 10/42*          (2006.01)
    *H02J 7/00*           (2006.01)
(52) U.S. Cl.
    CPC ........ *H01M 2220/30* (2013.01); *H02J 7/0063*
           (2013.01); *H02J 2207/50* (2020.01)

(56)            References Cited

U.S. PATENT DOCUMENTS

| | | | |
|---|---|---|---|
| 2013/0104916 A1 | 5/2013 | Bellinger et al. | |
| 2015/0027466 A1 | 1/2015 | Xiang | |
| 2017/0303595 A1 | 10/2017 | Bernauer et al. | |
| 2019/0008208 A1 | 1/2019 | Cirillo et al. | |
| 2020/0278707 A1 | 9/2020 | Sur | |

FOREIGN PATENT DOCUMENTS

| | | | |
|---|---|---|---|
| CN | 203446537 U | 2/2014 | |
| CN | 104037719 A | 9/2014 | |
| CN | 104218540 A | 12/2014 | |
| CN | 104303524 A | 1/2015 | |
| CN | 104432534 A | 3/2015 | |
| CN | 105077592 A | 11/2015 | |
| CN | 105578908 A | 5/2016 | |
| CN | 205992857 U | 3/2017 | |
| CN | 106858724 A | 6/2017 | |
| CN | 107072294 A | 8/2017 | |
| CN | 206371515 U | 8/2017 | |
| CN | 107205477 A | 9/2017 | |
| CN | 109283867 A | 1/2019 | |
| CN | 109393573 A | 3/2019 | |
| CN | 109419042 A | 3/2019 | |
| CN | 109963606 A | 7/2019 | |
| CN | 110122933 A | 8/2019 | |
| CN | 110169597 A | 8/2019 | |
| CN | 110169598 A | 8/2019 | |
| CN | 110279149 A | 9/2019 | |
| CN | 110367594 A | 10/2019 | |
| CN | 110522089 A | 12/2019 | |
| CN | 110558629 A | 12/2019 | |
| CN | 110680026 A | 1/2020 | |
| CN | 209931472 U | 1/2020 | |
| CN | 110742310 A | 2/2020 | |
| CN | 110959917 A | 4/2020 | |
| CN | 111011940 A | 4/2020 | |
| CN | 111083171 A | 4/2020 | |
| CN | 210299498 U | 4/2020 | |
| CN | 111096491 A | * | 5/2020 |
| CN | 111109657 A | 5/2020 | |
| CN | 210445680 U | 5/2020 | |
| CN | 111246756 A | 6/2020 | |
| CN | 111248504 A | 6/2020 | |
| CN | 111820464 A | 10/2020 | |
| CN | 111820482 A | 10/2020 | |
| CN | 214229837 U | 9/2021 | |
| CN | 214229838 U | 9/2021 | |
| GB | 2542011 A | 3/2017 | |
| JP | 2017127300 A | 7/2017 | |
| WO | 2015035623 A1 | 3/2015 | |
| WO | 2015035689 A1 | 3/2015 | |
| WO | 2015078085 A1 | 6/2015 | |
| WO | 2015089711 A1 | 6/2015 | |
| WO | 2015157928 A1 | 10/2015 | |
| WO | 2016019550 A1 | 2/2016 | |
| WO | 2017205692 A1 | 11/2017 | |
| WO | 2019173923 A1 | 9/2019 | |
| WO | 2020143697 A1 | 7/2020 | |
| WO | 2020174629 A1 | 9/2020 | |
| WO | 2020182068 A1 | 9/2020 | |

OTHER PUBLICATIONS

Chinese Patent Office, Office Action in Chinese Patent Application No. 202011026852.X (May 23, 2023).
Chinese Patent Office, Office Action in Chinese Patent Application No. 202011024382.3 (Jun. 21, 2023).
Chinese Patent Office, Office Action in Chinese Patent Application No. 202011026852.X (Nov. 14, 2023).
Chinese Patent Office, Office Action in Chinese Patent Application No. 202011024478.X (Dec. 18, 2023).
European Patent Office, Search Report in European Patent Application No. 20954595.3 (Nov. 23, 2023).
European Patent Office, Search Report in European Patent Application No. 20954597.9 (Nov. 23, 2023).
European Patent Office, Search Report in European Patent Application No. 20954596.1 (Nov. 23, 2023).
Chinese Patent Office, Notice of Registration and Notification to Grant Patent Right in Chinese Patent Application No. 202011024382.3 (Dec. 3, 2023).
European Patent Office, Office Action in European Patent Application No. 20954597.9 (Dec. 6, 2023).
Patent Cooperation Treaty, International Search Report and Written Opinion, International Application No. PCT/CN2020/117849 (Jun. 23, 2021).
Patent Cooperation Treaty, International Search Report and Written Opinion, International Application No. PCT/CN2020/117848 (Jun. 23, 2021).
Patent Cooperation Treaty, International Search Report and Written Opinion, International Application No. PCT/CN2020/117847 (Jun. 23, 2021).
Chinese Patent Office, First Office Action in Chinese Patent Application No. 202011024382.3 (Sep. 29, 2022).
Chinese Patent Office, Office Action in Chinese Patent Application No. 202011024396.5 (Dec. 24, 2024).
Chinese Patent Office, Office Action in Chinese Patent Application No. 202011024416.9 (Dec. 25, 2024).
Chinese Patent Office, Office Action in Chinese Patent Application No. 202010608642.5 (Jul. 26, 2022).
Chinese Patent Office, Notification of grant of patent right for invention in Chinese Patent Application No. 202010608642.5 (Jan. 5, 2023).
Patent Cooperation Treaty, International Search Report and Written Opinion, International Application No. PCT/CN2021/080825 (Jun. 23, 2021).
European Patent Office, Search Report in European Patent Application No. 21832491.1 (May 2, 2024).
Chinese Patent Office, First Office Action in Chinese Patent Application No. 202010607836.3 (Aug. 22, 2022).
Chinese Patent Office, Second Office Action in Chinese Patent Application No. 202010607836.3 (Feb. 26, 2023).
Chinese Patent Office, Notification of grant of patent right for invention in Chinese Patent Application No. 202010607836.3 (Apr. 21, 2023).
Patent Cooperation Treaty, International Search Report and Written Opinion, International Application No. PCT/CN2021/080824 (Jun. 21, 2021).
Chinese Patent Office, Notification of grant of patent right for invention in Chinese Patent Application No. 202011024416.9 (Apr. 24, 2025).
Chinese Patent Office, Notification of grant of patent right for invention in Chinese Patent Application No. 202011024396.5 (May 29, 2025).

* cited by examiner

BATTERY ROD AND ELECTRONIC VAPORIZATION DEVICE

CROSS-REFERENCE TO PRIOR APPLICATION

This application is a continuation of International Patent Application No. PCT/CN2020/117849, filed on Sep. 25, 2020. The entire disclosure is hereby incorporated by reference herein.

FIELD

This application relates to the field of electronic vaporization devices, and in particular, to a battery rod and an electronic vaporization device.

BACKGROUND

An electronic vaporization device mainly includes a vaporizer and a battery rod. The vaporizer is configured to store a to-be-vaporized substrate and heat and vaporize the to-be-vaporized substrate, and the battery rod is configured to provide energy for the vaporizer. The vaporizer generally includes a heating wire, and after the heating wire heats and vaporizes the to-be-vaporized substrate, the vaporized substrate is delivered to the mouth of a user through an airflow channel.

An identification circuit is generally arranged in an existing electronic vaporization device, during a normal use of a vaporizer that is provided with the identification circuit, the vaporizer cannot be reversely connected in the battery rod, and to prevent the reverse connection, an anti-reverse connection interface is generally provided on the battery rod.

SUMMARY

In an embodiment, the present invention provides a battery rod configured to drive a vaporizer inserted therein, the battery rod comprising: a driving chip; and a driving identification circuit connected to the driving chip, wherein, when the vaporizer is inserted in the battery rod, the driving chip is configured to determine that the vaporizer is forwardly inserted or reversely inserted through the driving identification circuit and to control the driving identification circuit to operate in a forward insertion mode or a reverse insertion mode.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
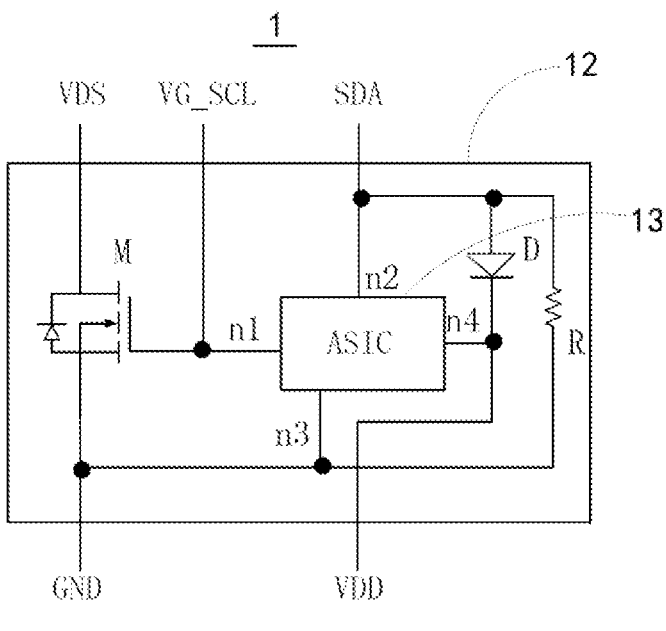
FIG. 1 is a schematic structural diagram of a first embodiment of a chip used for a vaporizer according to this application.

In an embodiment, the present invention provides a battery rod and an electronic vaporization device, so that a vaporizer can be used normally no matter the vaporizer is forwardly inserted in the battery rod or reversely inserted in the battery rod, and the user experience is improved.

In an embodiment, the present invention provides a battery rod, configured to drive a vaporizer that is inserted therein, including: a driving chip; and a driving identification circuit, connected to the driving chip, where when the vaporizer is inserted in the battery rod, the driving chip determines that the vaporizer is forwardly inserted or reversely inserted through the driving identification circuit and controls the driving identification circuit to operate in a forward insertion mode or a reverse insertion mode.

The driving identification circuit includes: a direction identification unit, a driving unit, and a power supply switching unit; the driving chip includes a detection communication port, a driving port, and a switching port; and the direction identification unit is connected to the detection communication port, the driving unit is connected to the driving port, and the power supply switching unit is connected to the switching port, where the driving chip determines that the vaporizer is forwardly inserted or reversely inserted through the detection communication port and the direction identification unit, and controls the power supply switching unit to switch through the switching port, so that the driving identification circuit operates in the forward insertion mode or the reverse insertion mode.

The detection communication port includes a first detection communication port and a second detection communication port; when it is determined that the first detection communication port is capable of communicating with the vaporizer, the vaporizer that is inserted in the battery rod is determined as being forwardly inserted; and when it is determined that the second detection communication port is capable of communicating with the vaporizer, the vaporizer that is inserted in the battery rod is determined as being reversely inserted.

The detection communication port includes a first detection communication port and a second detection communication port; when it is determined that a resistance value collected by the first detection communication port is a first preset range, and a resistance value collected by the second detection communication port is a second preset range, the vaporizer that is inserted in the battery rod is determined as being forwardly inserted; and when it is determined that the resistance value collected by the first detection communication port is the second preset range, and the resistance value collected by the second detection communication port is the first preset range, the vaporizer that is inserted in the battery rod is determined as being reversely inserted.

The battery rod further includes: a first connection pin and a second connection pin, configured to be electrically connected to the vaporizer that is inserted in the battery rod, where when the vaporizer that is inserted in the battery rod is forwardly inserted, the driving identification circuit operates in the forward insertion mode, so that the first connection pin serves as a power supply output end, and the second connection pin serves as a ground voltage output end; and when the vaporizer that is inserted in the battery rod is reversely inserted, the driving identification circuit operates in the reverse insertion mode, so that the first connection pin serves as the ground voltage output end, and the second connection pin serves as the power supply output end.

The direction identification unit includes: a first identification module, including a first resistor, where a first end of the first resistor is connected to a power supply voltage, and a second end of the first resistor is connected to the first detection communication port and the first connection pin; and a second identification module, including a second resistor, where a first end of the second resistor is connected to the power supply voltage, and a second end of the second resistor is connected to the second detection communication port and the second connection pin.

The driving unit includes a first driving module and a second driving module, and the driving port includes a first group of driving ports and a second group of driving ports, where the first driving module is connected to the first group of driving ports, and the second driving module is connected to the second group of driving ports; the power supply switching unit includes a first switching module and a second switching module, and the switching port includes a first switching port and a second switching port, where the first switching module is connected to the first switching port, the first driving module, and the first connection pin, and the second switching module is connected to the second switching port, the second driving module, and the second connection pin; when the vaporizer that is inserted in the battery rod is forwardly inserted, the first switching port and the second switching port switch the first switching module to a non-operating mode and the second switching module to an operating mode, so that the first connection pin is connected to the first driving module, and the second connection pin is connected to a ground voltage; and when the vaporizer that is inserted in the battery rod is reversely inserted, the first switching port and the second switching port switch the first switching module to the operating mode and the second switching module to the non-operating mode, so that the first connection pin is connected to the ground voltage, and the second connection pin is connected to the second driving module.

The first switching module includes a first switch, where a first channel end thereof is connected to the first connection pin, a second channel end thereof is connected to the ground voltage, and a control end thereof is connected to the first switching port; and the second switching module includes a second switch, where a first channel end thereof is connected to the second connection pin, a second channel end thereof is connected to the ground voltage, and a control end thereof is connected to the second switching port.

The first group of driving ports includes a first positive driving port and a second positive driving port; and the first driving module includes: a third switch, where a first channel end thereof is connected to the power supply voltage, a second channel end thereof is connected to the first connection pin, and a control end thereof is connected to the first positive driving port; a fourth switch, where a first channel end thereof is connected to the power supply voltage, and a control end thereof is connected to the second positive driving port; and a third resistor, where a first end thereof is connected to a second channel end of the fourth switch, and a second end thereof is connected to the first detection communication port and the first connection pin; and the second group of driving ports includes a first negative driving port and a second negative driving port; and the second driving module includes: a fifth switch, where a first channel end thereof is connected to the power supply voltage, a second channel end thereof is connected to the second connection pin, and a control end thereof is connected to the first negative driving port; a sixth switch, where a first channel end thereof is connected to the power supply voltage, and a control end thereof is connected to the second negative driving port; and a fourth resistor, where a first end thereof is connected to a second channel end of the sixth switch, and a second end thereof is connected to the second detection communication port and the second connection pin.

The switching port includes a first switching port and a second switching port; the power supply switching unit is connected between an output end of the driving unit and a ground voltage, and the power supply switching unit is connected to the first switching port, the second switching port, the first connection pin, and the second connection pin; when the vaporizer that is inserted in the battery rod is forwardly inserted, the first switching port and the second switching port switch the power supply switching unit to operate in a first mode, so that the first connection pin is connected to the output end of the driving unit, and the second connection pin is connected to the ground voltage; and when the vaporizer that is inserted in the battery rod is reversely inserted, the first switching port and the second switching port switch the power supply switching unit to operate in a second mode, so that the first connection pin is connected to the ground voltage, and the second connection pin is connected to the output end of the driving unit.

The power supply switching unit includes: a first switching module and a second switching module, where the first switching module is connected to the first switching port and the first connection pin, and is configured to be connected to the ground voltage, and the second switching module is connected to the second switching port and the second connection pin, and is configured to be connected to the ground voltage; when the vaporizer that is inserted in the battery rod is forwardly inserted, the first switching port switches the first switching module to be connected to the output end of the driving unit, and the second switching port switches the second switching module to be connected to the ground voltage; and when the vaporizer that is inserted in the battery rod is reversely inserted, the first switching port switches the first switching module to be connected to the ground voltage, and the second switching port switches the second switching module to be connected to the output end of the driving unit.

The first switching module includes: a fifth resistor, where a first end thereof is connected to the output end of the driving unit; a first capacitor, where a first end thereof is connected to the output end of the driving unit, and a second end thereof is connected to a second end of the fifth resistor; a first diode, where a first end thereof is connected to the second end of the fifth resistor, and a second end thereof is connected to the first switching port; a seventh switch, where a first channel end thereof is connected to the output end of the driving unit, a second channel end thereof is connected to the first connection pin, and a control end thereof is connected to the second end of the fifth resistor; and an eighth switch, where a first channel end thereof is connected to the first connection pin, a second channel end thereof is connected to the ground voltage, and a control end thereof is connected to the first switching port; and the second switching module includes: a sixth resistor, where a first end thereof is connected to the output end of the driving unit; a second capacitor, where a first end thereof is connected to the output end of the driving unit, and a second end thereof is connected to a second end of the sixth resistor; a second diode, where a first end thereof is connected to the second end of the sixth resistor, and a second end thereof is connected to the second switching port; a ninth switch, where a first channel end thereof is connected to the output end of the driving unit, a second channel end thereof is connected to the second connection pin, and a control end thereof is connected to the second end of the sixth resistor; and a tenth switch, where a first channel end thereof is connected to the second connection pin, a second channel end thereof is connected to the ground voltage, and a control end thereof is connected to the second switching port.

The driving port includes a first driving port and a second driving port; and the driving unit includes: an eleventh switch, where a first channel end thereof is connected to the power supply voltage, a second channel end thereof is connected to the output end of the driving unit, and a control end thereof is connected to the first driving port; a twelfth switch, where a first channel end thereof is connected to the power supply voltage, and a control end thereof is connected to the second driving port; and a seventh resistor, where a first end thereof is connected to a second channel end of the twelfth switch, and a second end thereof is connected to the output end of the driving unit.

To resolve the foregoing technical problem, a second technical solution provided in this application is to provide an electronic vaporization device, including: a vaporizer and a battery rod, where the battery rod is the battery rod according to any one of the foregoing, and the battery rod is configured to drive the vaporizer that is inserted therein.

The beneficial effects of this application are as follows: different from that of the related art, a battery rod and an electronic vaporization device provided in this application includes: a driving chip; and a driving identification circuit, connected to the driving chip, where when a vaporizer is inserted in the battery rod, the driving chip determines that the vaporizer is forwardly inserted or reversely inserted through the driving identification circuit and controls the driving identification circuit to operate in a forward insertion mode or a reverse insertion mode. Therefore, the vaporizer can be used normally no matter the vaporizer is forwardly inserted in the battery rod or reversely inserted in the battery rod, and the user experience is improved.

The following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

The following describes this application in detail with reference to the accompanying drawings and embodiments.

FIG. 1 is a schematic structural diagram of a first embodiment of a chip used for a vaporizer according to this application. Specifically, a chip 1 includes a package 12, where a communication interface SDA is provided on the package 12, and the communication interface SDA is configured to determine, when the vaporizer is inserted in a battery rod, whether the battery rod can communicate with the vaporizer. When the battery rod communicates with the vaporizer, the vaporizer operates in a first mode; and when the battery rod fails to communicate with the vaporizer, the vaporizer operates in a second mode.

Specifically, the chip 1 further includes: a control switch M and a driving control circuit 13, where the control switch M and the driving control circuit 13 are both arranged in the package 12. A control end n1 of the driving control circuit 13 is connected to a control end of the control switch M, and a communication end n2 of the driving control circuit 13 is connected to the communication interface SDA, to determine whether the battery rod can communicate with the vaporizer through the communication interface SDA.

Specifically, the package 12 further includes a switch channel interface VDS, a ground interface GND and a power supply interface VDD. The switch channel interface VDS is connected to a first channel end of the control switch M; the ground interface GND is connected to a second channel end of the control switch M and a ground end n3 of the driving control circuit 13; and the power supply interface VDD is connected to a power supply end n4 of the driving control circuit 13, and is connected to the communication interface SDA.

The package 12 further includes a switch control interface VG_SCL, where the switch control interface VG_SCL is further connected to the control end of the control switch M.

Optionally, the chip 1 further includes: a diode D, arranged in the package 12, where the communication interface SDA is connected to the power supply interface VDD through the diode D. Specifically, the diode D is a diode, where an anode of the diode is connected to the communication interface SDA, and a cathode of the diode is connected to the power supply end n4 of the driving control circuit 13 and is connected to the power supply interface VDD. In an alternative embodiment, the diode D may also be a metal-oxide-semiconductor field effect transistor (MOSFET), a triode, and the like.

Optionally, the chip 1 further includes: a resistor R, arranged in the package 12, where the communication interface SDA is connected to the ground interface GND through the resistor R. Specifically, a first end of the resistor R is connected to the communication interface SDA, and a second end thereof is connected to the ground interface GND.

Optionally, the driving control circuit 13 further includes a memory, where preset data is stored in the memory. When the vaporizer is inserted in the battery rod and the battery rod does not communicate with the vaporizer within a preset time period, the driving control circuit 13 may control the control switch M according to the preset data or does not perform any operation, so that the vaporizer operates in the second mode.

Optionally, the driving control circuit 13 is an application-specific integrated circuit (ASIC). Further, the diode D may alternatively be integrated into the ASIC formed by the driving control circuit 13.

Figure 2:
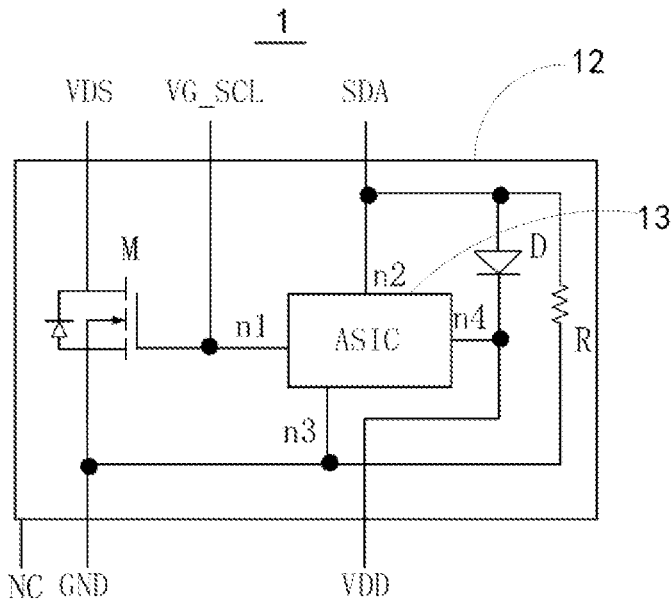
FIG. 2 is a schematic structural diagram of a second embodiment of a chip used for a vaporizer according to this application.

FIG. 2 is a schematic structural diagram of a first embodiment of a chip used for a vaporizer according to this application. Compared with the first embodiment shown in FIG. 1, a difference is that the chip 1 shown in this embodiment further includes: an extension interface NC, where the extension interface NC serves as a reserved interface of the chip 1. Optionally, the extension interface NC is electrically connected to the ground interface GND in the package 12.

The chip 1 shown in FIG. 2 is packaged by using SOT23-6, while the chip 1 shown in FIG. 1 is packaged by using SOT23-5, which can reduce costs to the greatest extent in terms of package. However, using the SOT23-6 package manner shown in FIG. 2 is more favorable to internal wiring of the chip 1. In the chips 1 shown in FIG. 1 and FIG. 2, the first channel end, the second channel end, and the control end (corresponding to a drain, a source, and a gate respectively) of the control switch M are independently led out. In an actual application, a problem of insufficient current can be resolved by introducing an additional switch that is connected in parallel with the control switch M, and a problem of reverse conduction of the control switch M can be prevented by introducing an additional switch that is connected in series with the control switch M.

Figure 3:
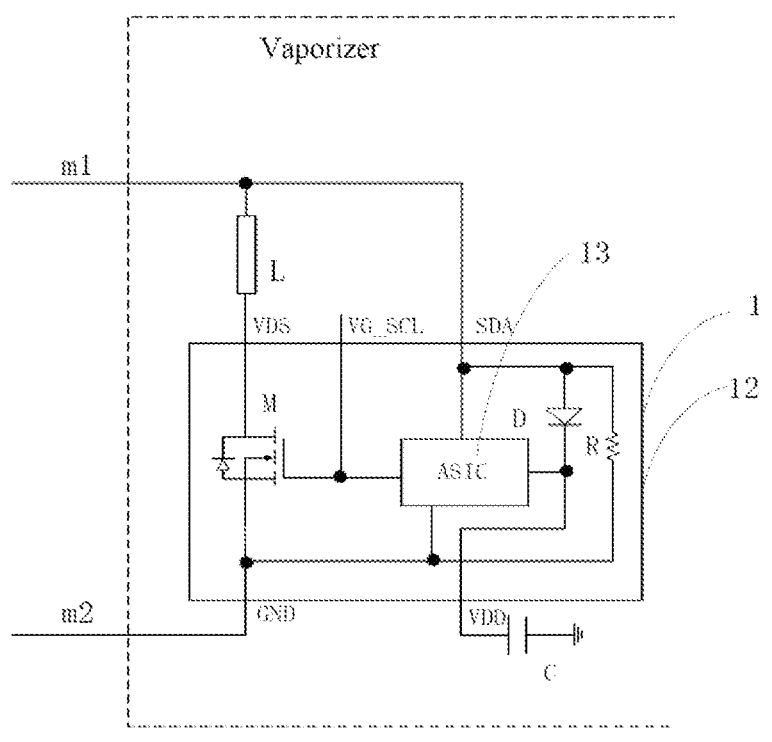
FIG. 3 is a schematic structural diagram of a first embodiment of a vaporizer according to this application.

FIG. 3 is a schematic structural diagram of a first embodiment of a vaporizer according to this application. The vaporizer includes a heating element L and a chip 1. The chip 1 is connected to the heating element L, where the chip 1 is the chip 1 shown in any embodiment in FIG. 1 and FIG. 2.

After the vaporizer is inserted in a battery rod, when the battery rod communicates with the vaporizer, the chip 1 controls the heating element L to generate heat, so that the vaporizer operates in a first mode; and when the battery rod fails to communicate with the vaporizer, the chip 1 controls the heating element L to generate heat or to not generate heat, so that the vaporizer operates in a second mode. Specifically, in a specific embodiment, if the battery rod communicates with the vaporizer, it indicates that the vaporizer can match the battery rod, and the vaporizer and the battery rod are products of a same model and produced by a same manufacturer. In this case, the vaporizer may be controlled to generate heat according to the model of the vaporizer to operate in the first mode. If the battery rod fails to communicate with the vaporizer, it indicates that the vaporizer cannot match the battery rod, and the vaporizer and the battery rod are not products of a same model and produced by a same manufacturer. In this case, a default parameter may be used for controlling the vaporizer to generate heat or prohibiting the vaporizer from generating heat to cause the vaporizer to operate in the second mode.

Specifically, the vaporizer further includes: a first input end m1 and a second input end m2. When the vaporizer is inserted in the battery rod, the vaporizer is electrically connected to the battery rod through the first input end m1 and the second input end m2. In this embodiment, the heating element L and the control switch M of the chip 1 are connected in series between the first input end m1 and the second input end m2, and the communication interface SDA of the package 12 is connected to the first input end m1.

Optionally, the vaporizer further includes: a capacitor C, where the power supply interface VDD of the package 12 is grounded through the capacitor C.

Specifically, a first end of the heating element L is connected to the first input end m1, and a second end thereof is connected to the first channel end of the control switch M. A first end of the capacitor C is connected to the power supply interface VDD, and a second end thereof is grounded.

Figure 4:
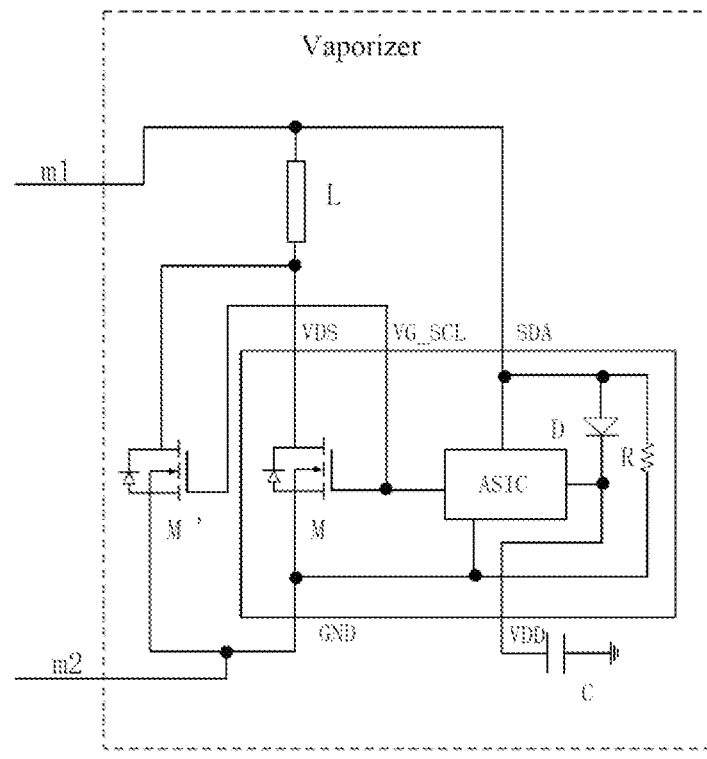
FIG. 4 is a schematic structural diagram of a second embodiment of a vaporizer according to this application.

FIG. 4 is a schematic structural diagram of a second embodiment of a vaporizer according to this application. Compared with the first embodiment of the vaporizer shown in FIG. 3, a difference is that this embodiment further includes a first switch M', and the first switch M' and the control switch M are connected in parallel. Specifically, a control end of the first switch M' is connected to a switch control interface VG_SCL, a first channel end of the first switch M' is connected to the switch channel interface VDS and the first channel end of the control switch M, and a second channel end of the first switch M' is connected to the ground interface GND and the second channel end of the control switch.

Figure 5:
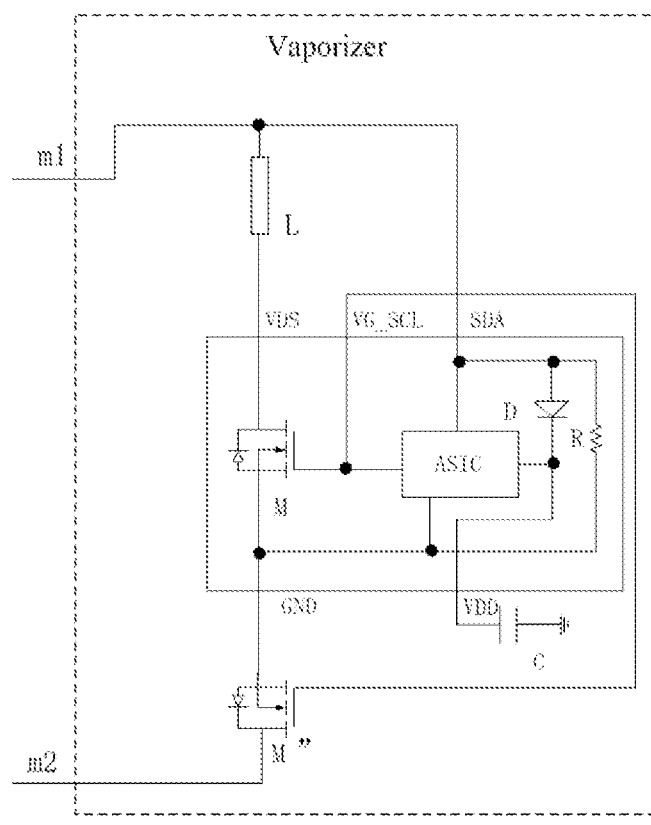
FIG. 5 is a schematic structural diagram of a third embodiment of a vaporizer according to this application.

In this embodiment, the first switch M' and the control switch M are connected in parallel, so that a conduction current is increased. For example, if a current that flows through the heating element L is 10 A, while the control switch M can only withstand a maximum current of 6 A, after completing an authentication operation, when the chip 1 turns on the control switch M and then uses a PWM signal to heat the heating element L, the control switch M cannot withstand the 10 A current, and an electronic vaporization device cannot vaporize normally. In this embodiment, since the extension interface NC or the ground interface GND is reserved, the first switch M' is externally connected, and the control switch M in the chip 1 and the first switch M' are connected in parallel, so that the conduction current is increased. FIG. 5 is a schematic structural diagram of a third embodiment of a vaporizer according to this application. Compared with the first embodiment of the vaporizer shown in FIG. 3, a difference is that this embodiment further includes a second switch M", where the second switch M" and the control switch M are connected in series. Specifically, a control end of the second switch M" is connected to the switch control interface VG_SCL, a first channel end of the second switch M" is connected to the ground interface GND and the second channel end of the control switch M, and a second channel end of the second switch M" is connected to the second input end m2. Specifically, in this embodiment, the heating element L, the control switch M, and the second switch M" are connected in series between the first input end m1 and the second input end m2 in sequence.

In this embodiment, when only the control switch M exists in the chip 1, if the vaporizer is reversely inserted in the battery rod, the heating element L is grounded. When the second channel end (a source) of the control switch M is connected to the power supply voltage VDD, the power supply voltage VDD forms a channel through a body diode of the control switch M, so that reverse conduction is achieved. When only the second switch M" exists in the chip 1, if the vaporizer is reversely inserted in the battery rod, a body diode of the second switch M" is in a turn-off state, which can prevent the vaporizer from being damaged due to the reverse conduction of the vaporizer. Therefore, the heating element L, the control switch M, and the second switch M" are connected in series between the first input end m1 and the second input end m2 in sequence, which can prevent a reverse conduction problem of the control switch M.

Operating modes of the vaporizers of the second embodiment and the third embodiment are similar to the operating mode of the vaporizer of the first embodiment. For brevity, details are not described herein again.

Figure 6:
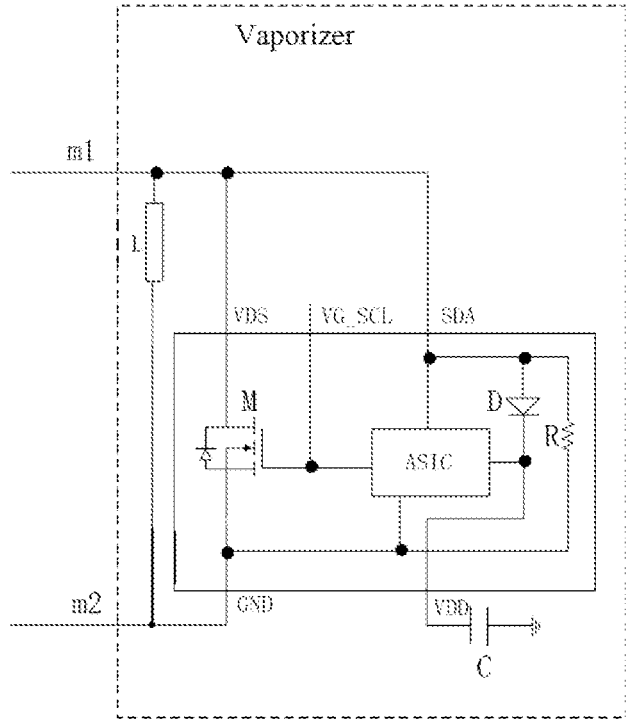
FIG. 6 is a schematic structural diagram of a fourth embodiment of a vaporizer according to this application.

FIG. 6 is a schematic structural diagram of a fourth embodiment of a vaporizer according to this application. In this embodiment, the heating element L and the control switch M are connected in parallel between the first input end m1 and the second input end m2. Specifically, one end of the heating element L is connected to the first input end m1, the switch channel interface VDS of the package 12 is connected to the first input end m1, and the other end of the heating element L is connected to the ground interface GND of the package 12. In this embodiment, the communication interface SDA of the package 12 is connected to the first input end m1, and the capacitor C is connected to the power supply interface VDD of the package 12 and is grounded. Specifically, the first end of the capacitor C is connected to the power supply interface VDD, and the second end thereof is grounded. Specifically, the first channel end of the control switch M is connected to the first input end m1, the second channel end of the control switch M is connected to the second input end m2, and the control end of the control switch M is connected to the control end n1 of a driving control circuit 13.

In this embodiment, if the battery rod successfully communicates with the vaporizer, the battery rod may heat the heating element L according to a heating parameter stored in the vaporizer to cause the vaporizer to operate in the first mode. In this embodiment, since the heating element L and the control switch M are connected in parallel, if the battery rod fails to communicate with the vaporizer, provided that the battery rod sends a PWM signal, the heating element can still generate heat to cause the vaporizer to operate in the second mode. In this embodiment, the heating element L and the control switch M are connected in parallel, and the battery rod may determine whether the battery rod and the vaporizer are products produced by a same manufacturer by determining whether the battery rod and the vaporizer can communicate successfully, so as to identify the vaporizer, but cannot implement a function of prohibiting use of the vaporizer if the battery rod and the vaporizer do not match.

The chip used for the vaporizer according to this application may achieve a series connection between the heating element and the control switch, or achieve a parallel connection between the heating element and the control switch, and may implement different functions according to different software settings, so as to meet different usage requirements of the vaporizer in different usage environments.

Figures 7, 8:
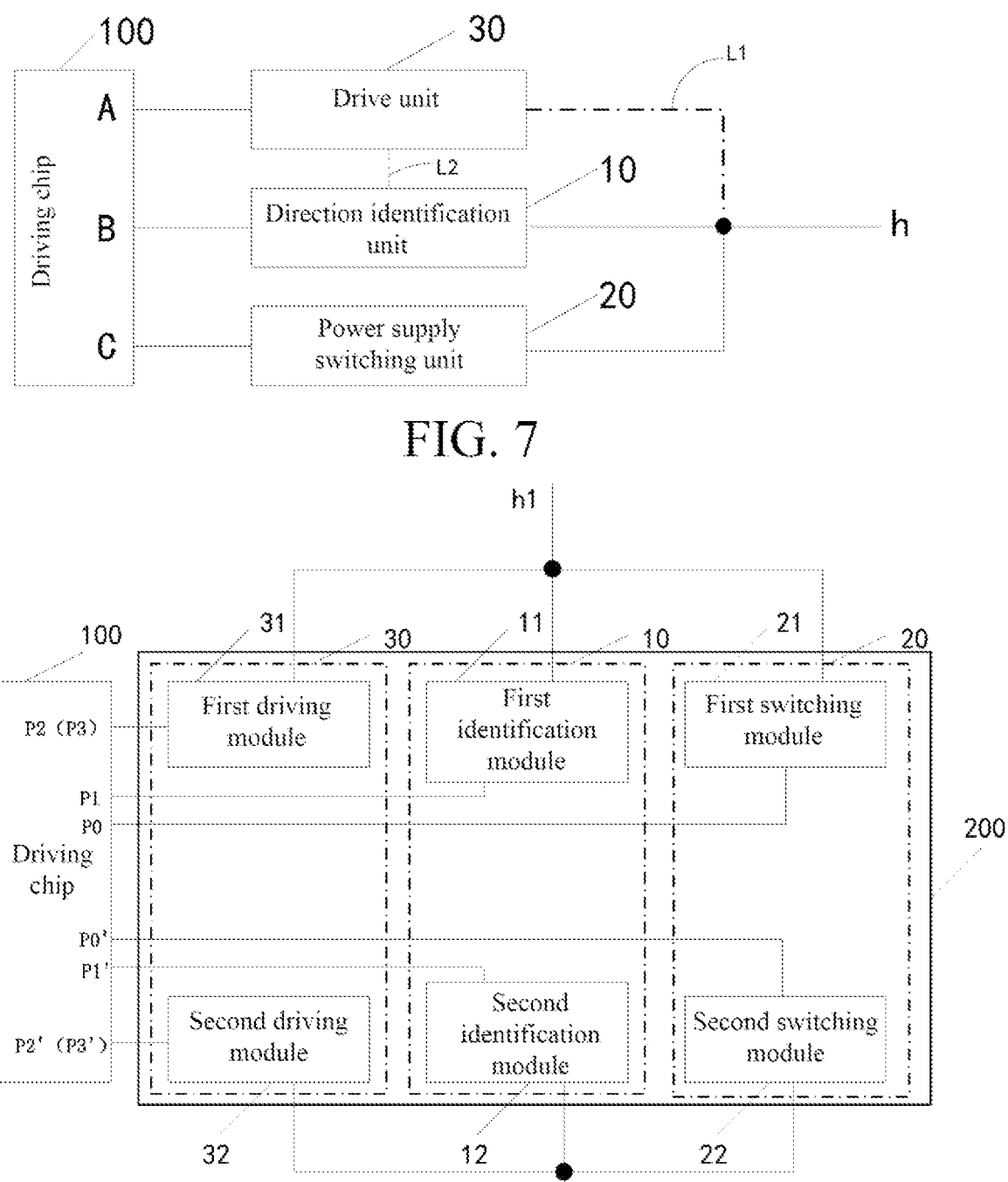
FIG. 7 is a schematic diagram of functional modules of a battery rod according to this application.
FIG. 8 is a schematic diagram of functional modules of a specific embodiment of FIG. 7.

FIG. 7 is a schematic diagram of functional modules of a battery rod according to this application. The battery rod is configured to drive a vaporizer that is inserted therein and supply power to the vaporizer.

The battery rod includes: a driving chip 100 and a driving identification circuit 200 that is connected to the driving chip 100. When the vaporizer is inserted in the battery rod, the driving chip 100 determines that the vaporizer is forwardly inserted or reversely inserted through the driving identification circuit 200 and controls the driving identification circuit 200 to operate in a forward insertion mode or a reverse insertion mode.

Specifically, the driving identification circuit 200 includes: a direction identification unit 10, a driving unit 30, and a power supply switching unit 20; and the driving chip 100 includes: a detection communication port B, a driving port A, and a switching port C. The direction identification unit 10 is connected to the detection communication port B, the driving unit 30 is connected to the driving port A, and the power supply switching unit 20 is connected to the switching port C. The direction identification unit 10 and the power supply switching unit 20 are electrically connected to a connection pin h respectively; and the driving unit 30 is electrically connected to the connection pin h directly (such as the dash-dot line L1 shown in the figure) or is electrically connected to the connection pin h through the power supply switching unit 20 (such as the dashed line L2 shown in the figure).

The driving chip 100 determines that the vaporizer is forwardly inserted or reversely inserted through the detection communication port B and the direction identification unit 10, and controls the power supply switching unit 20 to switch through the switching port C, so that the driving identification circuit 200 operates in the forward insertion mode or the reverse insertion mode.

Specifically, referring to FIG. 8, FIG. 8 is a schematic diagram of functional modules of a specific embodiment of FIG. 7, where the detection communication port B includes a first detection communication port P1 and a second detection communication port P1'. The direction identification unit 10 includes: a first identification module 11 and a second identification module 12. The first identification module 11 is connected to the first detection communication port P1, and the second identification module 12 is connected to the second detection communication port P1'. In an embodiment, when it is determined that the first detection communication port P1 can communicate with the vaporizer, the vaporizer that is inserted in the battery rod is determined as being forwardly inserted; and when it is determined that the second detection communication port P1' can communicate with the vaporizer, the vaporizer that is inserted in the battery rod is determined as being reversely inserted. Specifically, when the vaporizer is inserted in the battery rod, both the first detection communication port P1 and the second detection communication port P1' of the battery rod send a string of data to the vaporizer. If the first detection communication port P1 detects a feedback signal, it indicates that the vaporizer that is inserted in the battery rod is forwardly inserted. If the second detection communication port P1' detects the feedback signal, it indicates that the vaporizer that is inserted in the battery rod is reversely inserted.

The connection pin h further includes: a first connection pin h1 and a second connection pin h2, configured to be electrically connected to the vaporizer that is inserted in the battery rod. A description is made by using the vaporizer shown in the foregoing embodiment as an example. When the vaporizer that is inserted in the battery rod is forwardly inserted, the driving identification circuit 200 operates in the forward insertion mode, so that the first connection pin h1 serves as a power supply connection pin, and the second connection pin h2 serves as a ground voltage connection pin. In this case, the vaporizer is inserted in the battery rod, the first connection pin h1 is connected to the first input end m1, and the second connection pin h2 is connected to the second input end m2.

When the vaporizer that is inserted in the battery rod is reversely inserted, the driving identification circuit 200 operates in the reverse insertion mode, so that the first connection pin h1 serves as the ground voltage connection pin, and the second connection pin h2 serves as the power supply connection pin. In this case, the vaporizer is inserted in the battery rod, the first connection pin h1 is connected to the second input end m2, and the second connection pin h2 is connected to the first input end m1.

In another embodiment, the detection communication port B includes a first detection communication port P1 and a second detection communication port P1'. When it is determined that a resistance value collected by the first detection communication port P1 is a first preset range, and a resistance value collected by the second detection communication port P1' is a second preset range, the vaporizer that is inserted in the battery rod is determined as being forwardly inserted. When it is determined that the resistance value collected by the first detection communication port P1 is the second preset range, and the resistance value collected by the second detection communication port P1' is the first preset range, the vaporizer that is inserted in the battery rod is determined as being reversely inserted.

As shown in FIG. 8, in this embodiment, the driving port A includes a first group of driving ports P2 (P3) and a second group of driving ports P2' (P3'). The driving unit 30 includes a first driving module 31 and a second driving module 32. The first driving module 31 is connected to the first group of driving ports P2 (P3), and the second driving module 32 is connected to the second group of driving ports P2' (P3').

The power supply switching unit 20 includes a first switching module 21 and a second switching module 22. The switching port C includes a first switching port P0 and a second switching port P0'. The first switching module 21 is connected to the first switching port P0, the first driving module 31, and the first connection pin h1. The second switching module 22 is connected to the second switching port P0', the second driving module 32, and the second connection pin h2.

When the vaporizer that is inserted in the battery rod is forwardly inserted, the first switching port P0 and the second switching port P0' switch the first switching module 21 to a non-operating mode and the second switching module 22 to an operating mode, so that the first connection pin h1 is connected to the first driving module 31, and the second connection pin h2 is connected to a ground voltage. When the vaporizer that is inserted in the battery rod is reversely inserted, the first switching port P0 and the second switching port P0' switch the first switching module 21 to the operating mode and the second switching module 22 to the non-operating mode, so that the first connection pin h1 is connected to the ground voltage, and the second connection pin h2 is connected to the second driving module 32.

Figure 9:
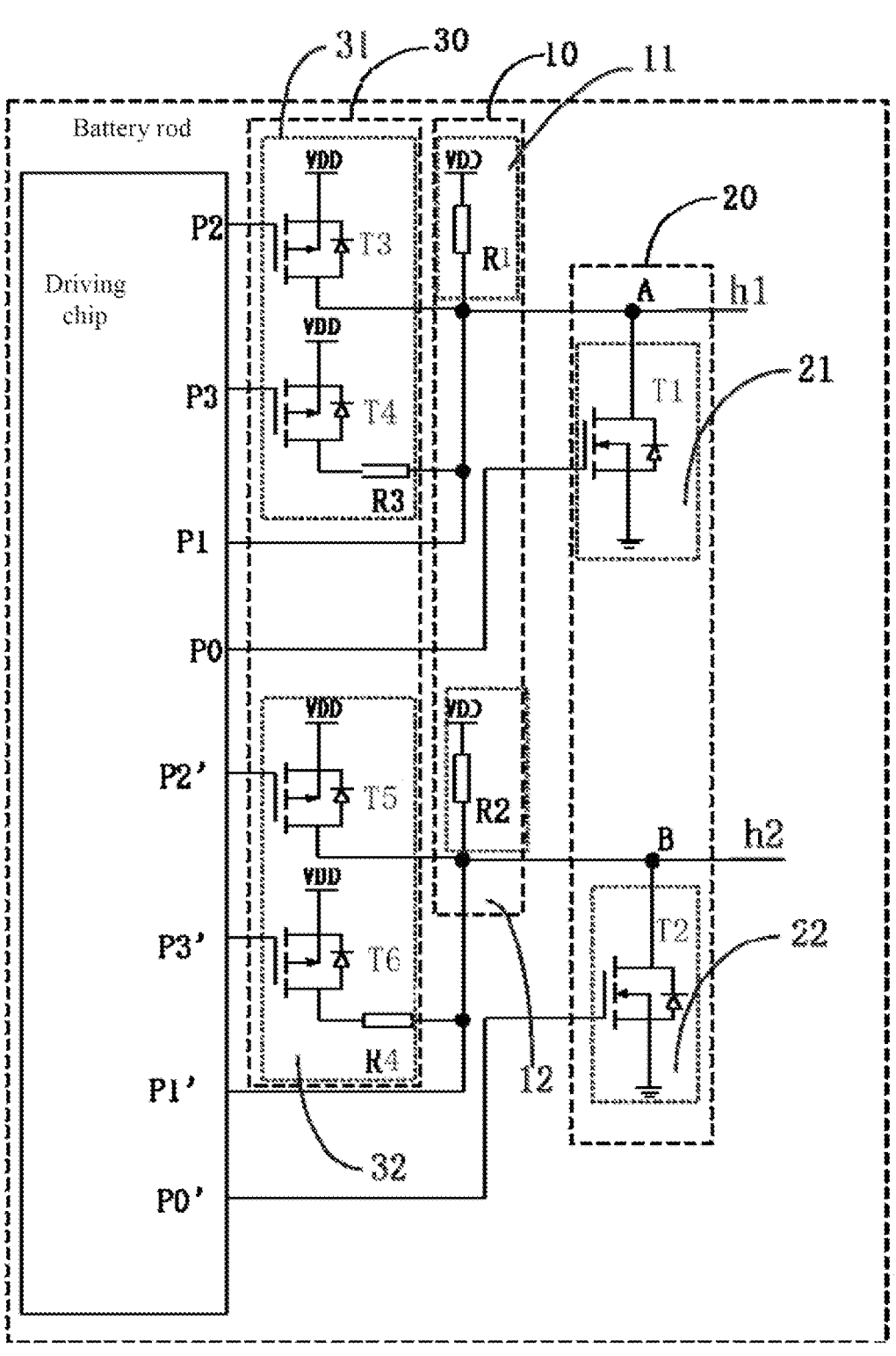
FIG. 9 is a schematic diagram of a circuit structure of an embodiment of FIG. 8.

FIG. 9 is a schematic diagram of a specific structure of the functional modules shown in FIG. 8. Specifically, the first identification module 11 includes a first resistor R1, where a first end of the first resistor R1 is connected to the power supply voltage VDD, and a second end of the first resistor R1 is connected to the first detection communication port P1 and the first connection pin h1. The second identification module 12 includes a second resistor R2, where a first end of the second resistor R2 is connected to the power supply voltage VDD, and a second end of the second resistor R2 is connected to the second detection communication port P1' and the second connection pin h2.

The first switching module 21 includes: a first switch T1, where a first channel end of the first switch T1 is connected to the first connection pin h1, a second channel end of the first switch T1 is connected to the ground voltage, and a control end of the first switch T1 is connected to the first switching port P0. The second switching module 22 includes: a second switch T2, where a first channel end of the second switch T2 is connected to the second connection pin h2, a second channel end of the second switch T2 is connected to the ground voltage, and a control end of the second switch T2 is connected to the second switching port P0'. When the vaporizer that is inserted in the battery rod is forwardly inserted, the first switching port P0 controls the first switch T1 to be turned off, and the second switching port P0' controls the second switch T2 to be turned on, so that the second connection pin h2 is connected to the ground voltage. When the vaporizer that is inserted in the battery rod is reversely inserted, the first switching port P0 controls the first switch T1 to be turned on, so that the first connection pin h1 is connected to the ground voltage, and the second switching port P0' controls the second switch T2 to be turned off.

The first group of driving ports P2 (P3) includes a first positive driving port P2 and a second positive driving port P3. The first driving module 31 includes: a third switch T3, a fourth switch T4, and a third resistor R3. A first channel end of the third switch T3 is connected to the power supply voltage VDD, a second channel end of the third switch T3 is connected to the first connection pin h1, and a control end of the third switch T3 is connected to the first positive driving port P2 A first channel end of the fourth switch T4 is connected to the power supply voltage VDD, and a control end of the fourth switch T4 is connected to the second positive driving port P3. A first end of the third resistor R3 is connected to a second channel end of the fourth switch T4, and a second end of the third resistor R3 is connected to the first detection communication port P1 and the first connection pin h1.

The second group of driving ports P2' (P3') includes a first negative driving port P2' and a second negative driving port P3'. The second driving module 32 includes: a fifth switch T5, a sixth switch T6, and a fourth resistor R4. A first channel end of the fifth switch T5 is connected to the power supply voltage VDD, a second channel end of the fifth switch T5 is connected to the second connection pin h2, and a control end of the fifth switch T5 is connected to the first negative driving port P2'. A first channel end of the sixth switch T6 is connected to the power supply voltage VDD, and a control end of the sixth switch T6 is connected to the second negative driving port P3'. A first end of the fourth resistor R4 is connected to a second channel end of the sixth switch T6, and a second end of the fourth resistor R4 is connected to the second detection communication port P1' and the second connection pin h2.

When the direction identification circuit 10 identifies that the vaporizer is forwardly inserted in the battery rod, the first positive driving port P2 and the second positive driving port P3 are used to control the third switch T3 and the fourth switch T4 to be turned on, thereby heating the heating element L. When the direction identification circuit 10 identifies that the vaporizer is reversely inserted in the battery rod, the first negative driving port P2' and the second negative driving port P3' are used to control the fifth switch T5 and the sixth switch T6 to be turned on, thereby heating the heating element L.

The battery rod shown in this embodiment can identify whether the inserted vaporizer is forwardly inserted or reversely inserted, and select a corresponding driving manner to drive the vaporizer according to an identification result, so that no matter the vaporizer is forwardly inserted or reversely inserted in the battery rod, the vaporizer may be driven by the battery rod to operate.

Figure 10:
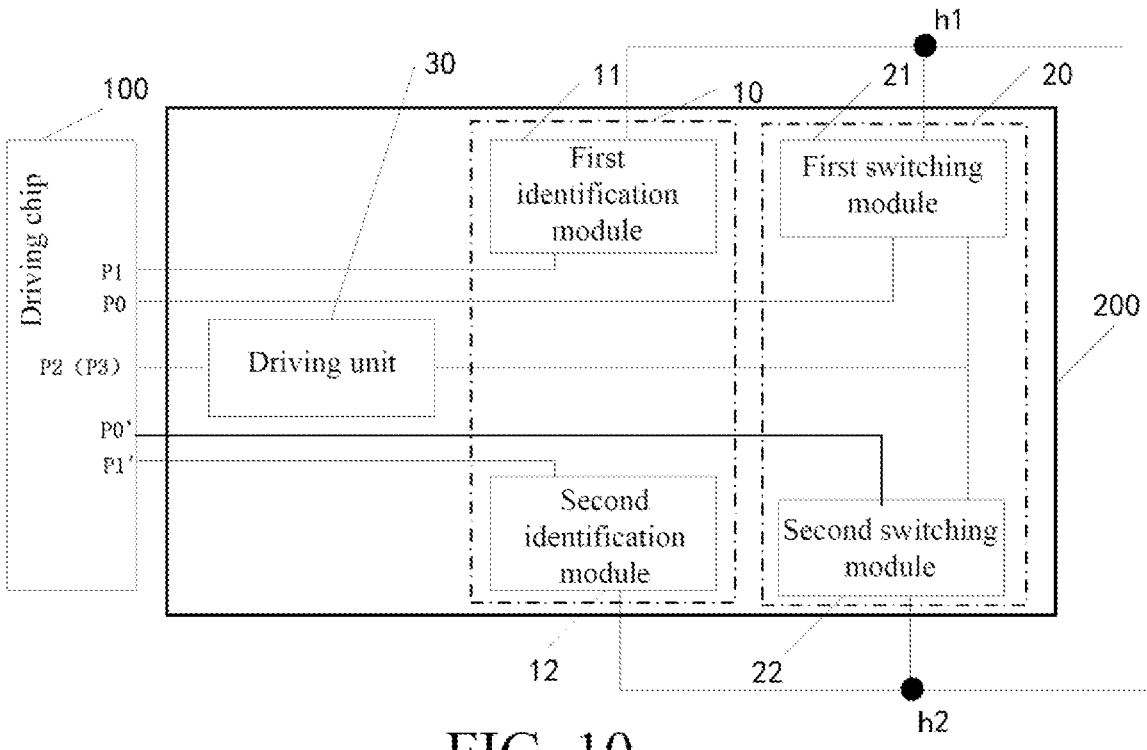
FIG. 10 is a schematic diagram of functional modules of another specific embodiment of FIG. 7.

FIG. 10 is a schematic diagram of functional modules of another specific embodiment of FIG. 7. In this embodiment, the driving unit 30 only includes one driving module.

Figure 11:
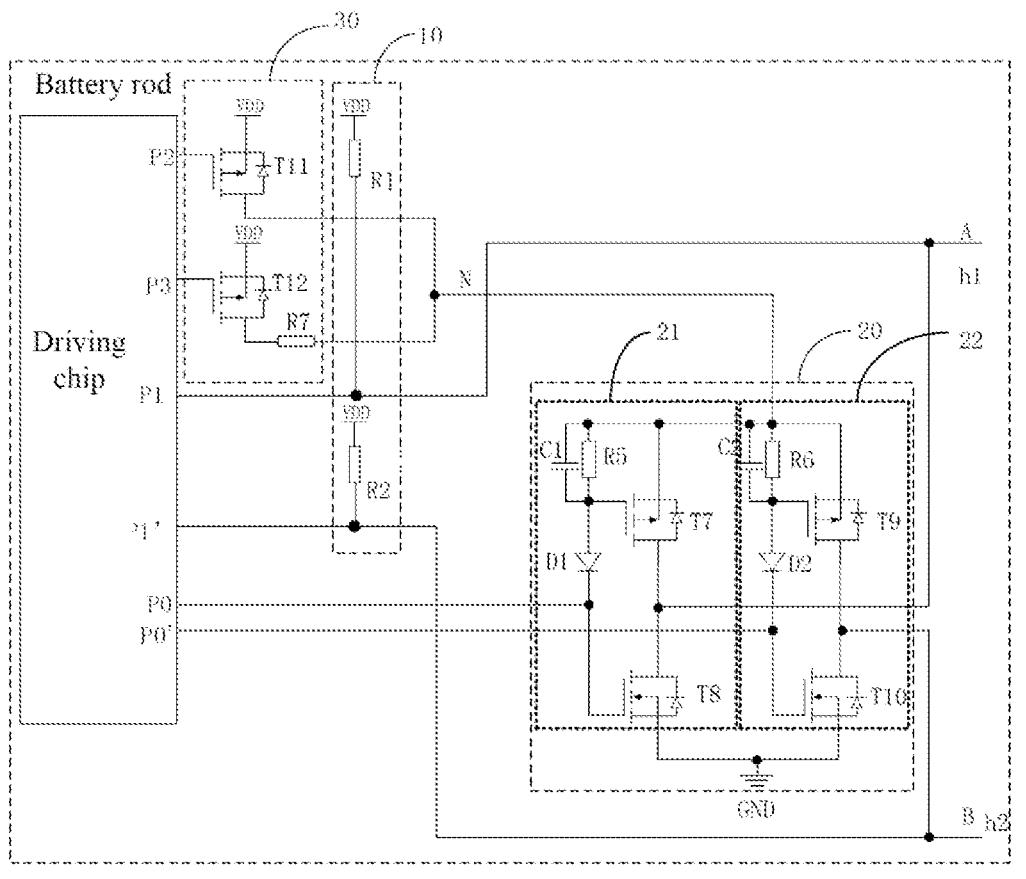
FIG. 11 is a schematic diagram of a circuit structure of an embodiment of FIG. 10.

Specifically, referring to FIG. 11, FIG. 11 is a specific schematic diagram of a specific structure of the function modules shown in FIG. 10. In this embodiment, the direction identification circuit 10 is the same as the direction identification circuit 10 in the battery rod shown in FIG. 9, and details are not described herein again. A difference between the direction identification circuit 10 in this embodiment and the direction identification circuit in the battery rod shown in FIG. 9 is that:

when the vaporizer that is inserted in the battery rod is forwardly inserted, the first switching port P0 and the second switching port P0' switch the power supply switching unit 20 to operate in a first mode, so that the first connection pin h1 is connected to an output end N of the driving unit 30, and the second connection pin h2 is connected to the ground voltage GND.

When the vaporizer that is inserted in the battery rod is reversely inserted, the first switching port P0 and the second switching port P0' switch the power supply switching unit 20 to operate in a second mode, so that the first connection pin h1 is connected to the ground voltage GND, and the second connection pin h2 is connected to the output end N of the driving unit 30. Specifically, in this embodiment, the power supply switching unit 20 includes: a first switching module 21 and a second switching module 22. The first switching module 21 is connected to the first switching port P0 and the first connection pin h1, and is configured to be connected to the ground voltage GND, and the second switching module 22 is connected to the second switching port P0' and the second connection pin h2, and is configured to be connected to the ground voltage GND. When the vaporizer that is inserted in the battery rod is forwardly inserted, the first switching port P0 switches the first switching module 31 to be connected to the output end N of the driving unit 30, and the second switching port P0' switches the second switching module 22 to be connected to the ground voltage GND. When the vaporizer that is inserted in the battery rod is reversely inserted, the first switching port P0 switches the first switching module 31 to be connected to the ground voltage GND, and the second switching port P0' switches the second switching module 22 to be connected to the output end N of the driving unit.

Specifically, as shown in FIG. 11, the first switching module 21 includes: a fifth resistor R5, a first capacitor C1, a first diode D1, a seventh switch T7, and an eighth switch T8. A first end of the fifth resistor R5 is connected to the output end N of the driving unit. A first end of the first capacitor C1 is connected to the output end N of the driving unit, and a second end of the first capacitor C1 is connected to a second end of the fifth resistor R5. A first end of the first diode D1 is connected to the second end of the fifth resistor R5, and a second end of the first diode D1 is connected to the first switching port P0. A first channel end of the seventh switch T7 is connected to the output end N of the driving unit, a second channel end of the seventh switch T7 is connected to the first connection pin h1, and a control end of the seventh switch T7 is connected to the second end of the fifth resistor R5. A first channel end of the eighth switch T8 is connected to the first connection pin h1, a second channel end of the eighth switch T8 is connected to the ground voltage GND, and a control end thereof is connected to the first switching port P0.

Specifically, the second switching module 22 includes: a sixth resistor R6, a second capacitor C2, a second diode D2, a ninth switch T9, and a tenth switch T10. A first end of the sixth resistor R6 is connected to the output end N of the driving unit. A first end of the second capacitor C2 is connected to the output end N of the driving unit, and a second end of the second capacitor C2 is connected to a second end of the sixth resistor R6. A first end of the second diode D2 is connected to the second end of the sixth resistor R6, and a second end of the second diode D2 is connected to the second switching port P0'. A first channel end of the ninth switch T9 is connected to the output end N of the driving unit, a second channel end of the ninth switch T9 is connected to the second connection pin h2, and a control end of the ninth switch T9 is connected to the second end of the sixth resistor R6. A first channel end of the tenth switch T10 is connected to the second connection pin h2, a second channel end of the tenth switch T10 is connected to the ground voltage GND, and a control end of the tenth switch T10 is connected to the second switching port P0'.

In this embodiment, the driving port A includes a first driving port P2 and a second driving port P3. The driving unit 30 includes: an eleventh switch T11, a twelfth switch T12, and a seventh resistor R7. A first channel end of the eleventh switch T11 is connected to the power supply voltage VDD, a second channel end of the eleventh switch T11 is connected to the output end N of the driving unit, and a control end of the eleventh switch T11 is connected to the first driving port P2. A first channel end of the twelfth switch T12 is connected to the power supply voltage VDD, and a control end of the twelfth switch T12 is connected to the second driving port P3. A first end of the seventh resistor R7 is connected to a second channel end of the twelfth switch T12, and a second end of the seventh resistor is connected to the output end N of the driving unit.

The direction identification circuit 10 shown in this embodiment is the same as the direction identification circuit 10 in the battery rod shown in FIG. 9, and details are not described herein again.

If the direction identification circuit 10 identifies that the vaporizer is forwardly inserted in the battery rod, the first switching port P0 outputs a low-level signal, so that the seventh switch M7 is turned on, and the first connection pin h1 is connected to the output end N of the driving circuit; and the second switching port P0' outputs a high-level signal, so that the tenth switch T10 is turned on, the point B is grounded, and the second connection pin h2 is grounded.

If the direction identification circuit 10 identifies that the vaporizer is reversely inserted in the battery rod, the first switching port P0 outputs a high-level signal, so that the ninth switch M9 is turned on, and the second connection pin h2 is connected to the output end N of the driving circuit; and the second switching port P0' outputs a low-level signal, so that the eighth switch T8 is turned on, the point A is grounded, and the first connection pin h1 is grounded.

In this embodiment, the first capacitor C1, the first diode D1, the fifth resistor R5 in the first switching module 21 and the second capacitor C2, the second diode D2, and the sixth resistor R6 in the second switching module 22 can ensure that the corresponding seventh switch T7 and the ninth switch T9 can be quickly turned on when the eleventh switch T11 is turned on, and ensure that the corresponding seventh switch T7 and the ninth switch T9 can continue to be in a turn-on state when the eleventh switch T11 is turned off.

When the vaporizer is forwardly inserted in the battery rod, the eleventh switch T11 outputs a PWM signal to supply power to the heating element L, and the first driving port P2 is at a low level, the eleventh switch T11 is turned on (equivalent to a high-level state of the PWM signal) to supply power to sources of the seventh switch T7 and the ninth switch T9. In this case, since the eighth switch T8 is turned off, a gate of the seventh switch T7 is clamped to the low level by the first diode D1 and the first switching port P0, thereby turning on the seventh switch T7. The first capacitor C1 is charged to a voltage difference ΔV between the gate and the source of the seventh switch T7, so that a current is connected to the first input end m1 of the vaporizer through the seventh switch T7, that is, the output end N of the driving circuit is input to the first input end m1 of the vaporizer. When the first driving port P2 is at a high level, the eleventh switch T11 is turned off (equivalent to a low level state of the PWM signal), and the source of the seventh switch T7 is pulled down to a low voltage by the heating element L. However, since the first capacitor C1 only has a discharging channel of the fifth resistor R5, a power failure of voltages on two ends of the first capacitor C1 does not occur quickly, so that the seventh switch T7 may be turned on continuously, that is, the output end N of the driving circuit is input to the first input end m1 of the vaporizer, so as to ensure that the twelfth switch T12 and a channel of the seventh resistor R7 may collect a parameter of the heating element L.

When the vaporizer is reversely inserted in the battery rod, the eleventh switch T11 outputs a PWM signal to supply power to the heating element L, and the first driving port P2 is at a low level, the eleventh switch T11 is turned on (equivalent to a high-level state of the PWM signal) to supply power to sources of the seventh switch T7 and the ninth switch T9. In this case, since the tenth switch T10 is turned off, a gate of the ninth switch T9 is clamped to the low level by the second diode D2 and the second switching port P0', thereby turning on the ninth switch T9. The second capacitor C2 is charged to a voltage difference ΔV between the gate and the source of the ninth switch T9, so that a current is input to the second input end m2 of the vaporizer through the ninth switch T9, that is, the output end N of the driving circuit is input to the second input end m2 of the vaporizer. When the first driving port P2 is at a high level, the eleventh switch T11 is turned off (equivalent to a low-level state of the PWM signal), and the source of the ninth switch T9 is pulled down to a low voltage by the heating element L. However, since the second capacitor C2 only has a discharging channel of the sixth resistor R6, power failure of voltages on two ends of the second capacitor C2 does not occur quickly, so that the ninth switch T9 may be turned on continuously, that is, the output end N of the driving circuit is input to the second input end m2 of the vaporizer, thereby ensuring that the twelfth switch T12 and a channel of the seventh resistor R7 may collect a parameter of the heating element L.

Figure 12:
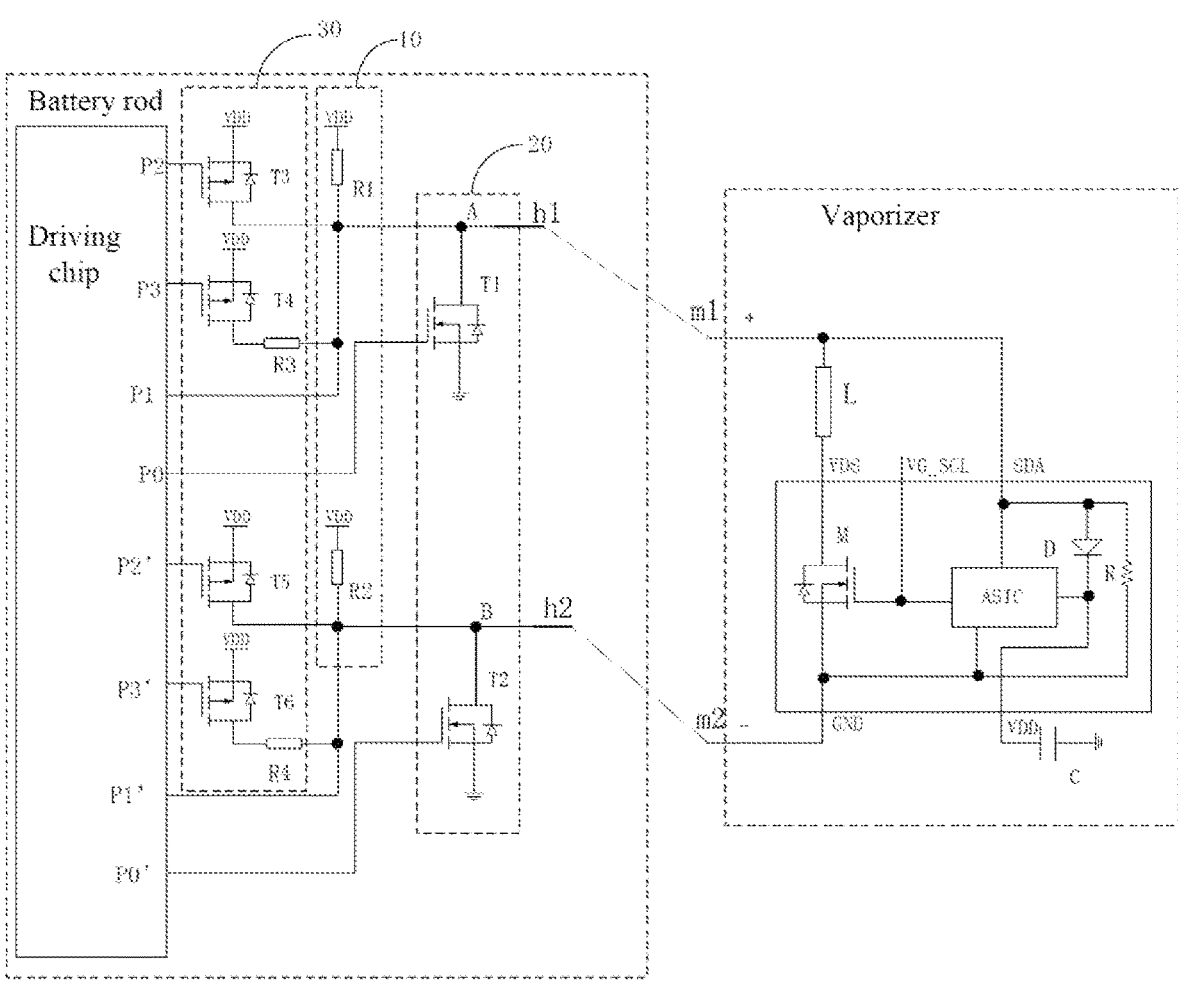
FIG. 12 is a schematic structural diagram of an embodiment of an electronic vaporization device formed by forwardly inserting the vaporizer shown in FIG. 3 in the battery rod shown in FIG. 9.

FIG. 12 is a schematic structural diagram of the vaporizer shown in FIG. 3 that is forwardly inserted in the battery rod shown in FIG. 9.

Specifically, the second switch T2 is set to be turned on. When the vaporizer is inserted in the battery rod, the first resistor R1 of the battery rod and the resistor R of the vaporizer divide the power supply voltage VDD, and the first detection communication port P1 detects a jump signal and further wakes up a driving chip MCU of the battery rod. In this case, the first detection communication port P1 and the second detection communication port P1' of the driving chip 100 of the battery rod respectively send a series of data to the vaporizer through the first connection pin h1 and the second connection pin h2. If the first detection communication port P1 detects a feedback signal, it indicates that the vaporizer is forwardly inserted in the battery rod; and if the second detection communication port P1' detects a feedback signal, it indicates that the vaporizer is reversely inserted in the battery rod.

Specifically, in another embodiment, when it is determined that a resistance value collected by the first detection communication port P1 is a first preset range, and a resistance value collected by the second detection communication port P1' is a second preset range, the vaporizer that is inserted in the battery rod is determined as being forwardly inserted. Otherwise, the vaporizer is determined as being reversely inserted, that is, if the resistance value collected by the first detection communication port P1 is an internal resistance of the driving control circuit 13 (for example, greater than 3 kΩ), and the resistance value collected by the second detection communication port P1' is a resistance value of the heating element L (for example, less than 3Ω), it indicates that the vaporizer is forwardly inserted in the battery rod; and if the resistance value collected by the first detection communication port P1 is the resistance value of the heating element L (for example, less than 3Ω), and the resistance value collected by the second detection communication port P1' is the internal resistance of the driving control circuit 13 (for example, greater than 3 kΩ), it indicates that the vaporizer is reversely inserted in the battery rod.

In this embodiment, a description is made by using the vaporizer being forwardly inserted in the battery rod as an example. Specifically, the first connection pin h1 of the battery rod is connected to the first input end m1 of the vaporizer, and the second connection pin h2 of the battery rod is connected to the second input end m2 of the vaporizer. In addition, in this embodiment, the first switching port P0 controls the first switch T1 to be turned off, and the second switching port P0' controls the second switch T2 to be turned off, so that the point B is connected to the ground voltage. In this case, the battery rod provides the power supply voltage VDD to the first input end m1 of the vaporizer through the first driving module 31, and further heats the heating element L.

Figure 13:
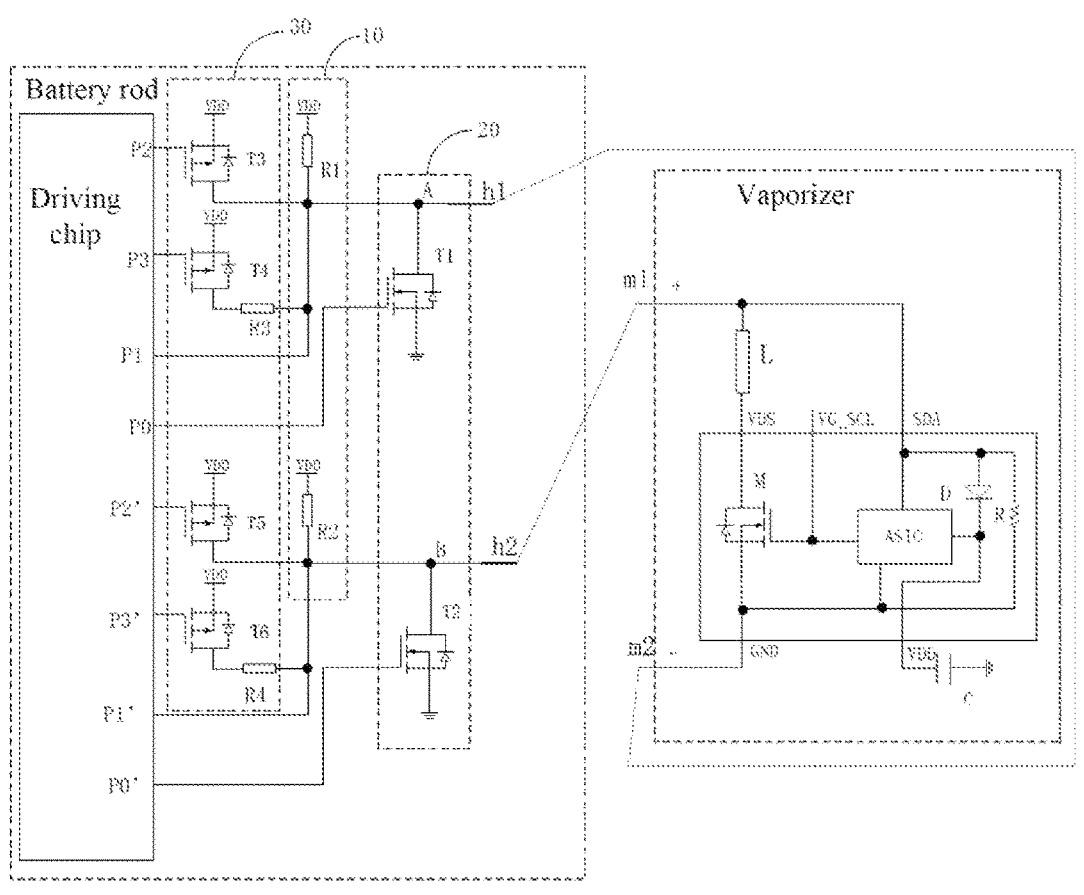
FIG. 13 is a schematic structural diagram of an embodiment of an electronic vaporization device formed by reversely inserting the vaporizer shown in FIG. 3 in the battery rod shown in FIG. 9.

FIG. 13 is a schematic structural diagram of the vaporizer shown in FIG. 3 that is reversely inserted in the battery rod shown in FIG. 9.

Specifically, the first switch T1 is set to be turned on. When the vaporizer is inserted in the battery rod, the second resistor R2 of the battery rod and the resistor R of the vaporizer divide the power supply voltage VDD, and the second detection communication port P1' detects a jump signal and further wakes up a driving chip MCU of the battery rod. In this case, the first detection communication port P1 and the second detection communication port P1' of the driving chip 100 of the battery rod respectively send a series of data to the vaporizer through the first connection pin h1 and the second connection pin h2. If the first detection communication port P1 detects a feedback signal, it indicates that the vaporizer is forwardly inserted in the battery rod; and if the second detection communication port P1' detects a feedback signal, it indicates that the vaporizer is reversely inserted in the battery rod.

Specifically, in another embodiment, when it is determined that a resistance value collected by the first detection communication port P1 is a first preset range, and a resistance value collected by the second detection communication port P1' is a second preset range, the vaporizer that is inserted in the battery rod is determined as being forwardly inserted. Otherwise, the vaporizer is determined as being reversely inserted, that is, if the resistance value collected by the first detection communication port P1 is an internal resistance of the driving control circuit 13 (for example, greater than 3 kΩ), and the resistance value collected by the second detection communication port P1' is a resistance value of the heating element L (for example, less than 3Ω), it indicates that the vaporizer is forwardly inserted in the battery rod; and if the resistance value collected by the first detection communication port P1 is the resistance value of the heating element L (for example, less than 3Ω), and the resistance value collected by the second detection communication port P1' is the internal resistance of the driving control circuit 13 (for example, greater than 3 kΩ), it indicates that the vaporizer is reversely inserted in the battery rod.

In this embodiment, a description is made by using the vaporizer being forwardly inserted in the battery rod as an example. Specifically, the first connection pin h1 of the battery rod is connected to the second input end m2 of the vaporizer, and the second connection pin h2 of the battery rod is connected to the first input end m1 of the vaporizer. In addition, in this embodiment, the first switching port P0 controls the first switch T1 to be turned on, and the second switching port P0' controls the second switch T2 to be turned off, so that the point A is connected to the ground voltage. In this case, the battery rod provides the power supply voltage VDD to the first input end m1 of the vaporizer through the second driving module 32, and then heats the heating element L.

For a specific operating principle of the vaporizer shown in FIG. 3 that is forwardly inserted or reversely inserted in the battery rod shown in FIG. 11, reference may be made to the foregoing descriptions, and details are not described herein again.

Figure 14:
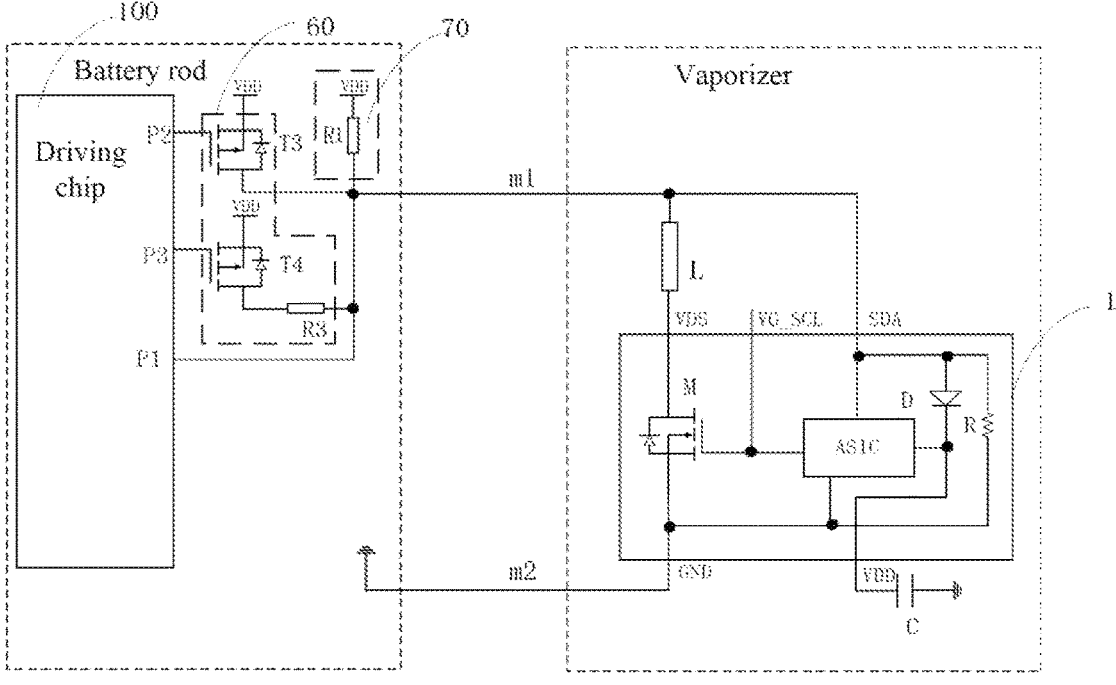
FIG. 14 is a schematic structural diagram of an electronic vaporization device according to this application.

FIG. 14 is a schematic structural diagram of an embodiment of an electronic vaporization device according to this application. Specifically, the electronic vaporization device includes a battery rod and a vaporizer, where the battery rod includes a driving chip 100, a driving circuit 60, and an identification circuit 70, where the driving circuit 60 may be the first driving module 31 shown in FIG. 9, and the identification circuit 70 may be the first identification module 11 shown in FIG. 9. For detailed descriptions, reference may be made to the description in FIG. 9.

The vaporizer is the vaporizer shown in FIG. 3, and for detailed descriptions, reference may be made to the description in FIG. 3. In this embodiment, the vaporizer includes a chip 1, where the chip 1 is configured to communicate with the battery rod when the vaporizer is inserted in the battery rod. Specifically, the chip 1 includes a communication port SDA, and the chip 1 can communicate with the battery rod through the communication port SDA. The vaporizer further includes a capacitor C, where the capacitor C is connected to the chip 1. When the vaporizer is inserted in the battery rod, the capacitor C is charged according to a communication signal between the vaporizer and the battery rod, so as to use the capacitor C to supply power to the chip, to cause the chip to operate normally.

Figure 15:
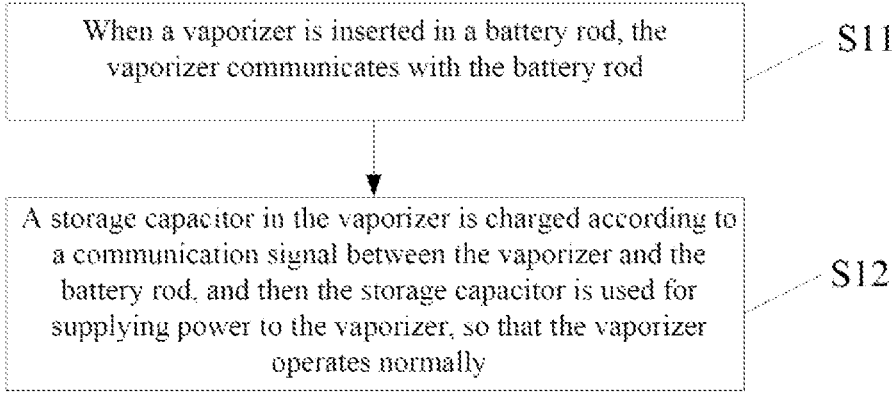
FIG. 15 is a schematic flowchart of an embodiment of a method for using the vaporizer in FIG. 14.

Specifically, referring to FIG. 15, FIG. 15 is a schematic flowchart of an embodiment of a method for using the vaporizer in FIG. 14, including:

Step S11: When the vaporizer is inserted in a battery rod, the vaporizer communicates with the battery rod. Step S12: A capacitor in the vaporizer is charged according to a communication signal between the vaporizer and the battery rod, and then the capacitor is used to supply power to the vaporizer, to cause the vaporizer to operate normally.

Specifically, the capacitor C in the vaporizer is connected to the chip 1. When the vaporizer is inserted in the battery rod, the first resistor R1 in the identification circuit 70 of the battery rod and the resistor R in the vaporizer divide a voltage. A jump signal is generated at the detection communication port P1 of the battery rod, and the driving chip 100 in the battery rod is waken up, and the driving circuit of the battery rod is continuously turned on to charge the capacitor C in the vaporizer. After the capacitor C is charged, the capacitor C may be used to supply power to the chip 1, to cause the chip 1 to operate normally.

Specifically, the chip 1 includes a communication interface SDA and a power supply interface VDD, where the power supply interface VDD is connected to the capacitor C. The communication interface SDA and the power supply interface VDD of the chip 1 are connected through an internal circuit. When the vaporizer communicates with the battery rod, the capacitor C is charged by the internal circuit through the communication interface SDA.

In an embodiment, when the battery rod and the vaporizer are operating, the detection communication port P1 or the driving port P2 or P3 of the battery rod may send a communication signal to the vaporizer. For example, the battery rod may use a BMC encoding manner to send the communication signal.

When the communication signal received by the vaporizer is a data storage command and storage data, after the vaporizer receives the communication signal, the capacitor C can receive a charging voltage provided by the battery rod to be charged and store electric energy within a first preset time period, so that the capacitor C can supply power to the chip 1 through the stored electric energy, and the chip 1 can normally complete data storage and return a corresponding communication signal. For example, if the battery rod needs to update a current inhalation parameter in the vaporizer, the communication signal received by the vaporizer is a data storage command and an updated current inhalation parameter. The vaporizer stores the updated current inhalation parameter according to the data storage command. In this case, during a data storage process, the capacitor C can receive the charging voltage provided by the battery rod to be charged and store the electric energy within the first preset time period, so that the capacitor C can supply power to the chip 1 through the stored electric energy, and the chip 1 can be normally supplied with electric energy during the data storage process and return a corresponding communication signal after data storage is completed.

When the chip 1 writes the storage data into an internal memory, a high current is required, for example, 5 mA to 30 mA. In this case, the battery rod continuously provides a high voltage and a high current to the vaporizer. After the chip 1 completes writing of the storage data, the battery rod stops supplying power to the vaporizer, so that the driving control circuit 13 can keep the voltage stable during writing of the storage data.

When the communication signal received by the vaporizer is a common command or a data read command, after the vaporizer receives the communication signal, the capacitor C can receive the charging voltage provided by the battery rod to be charged and store electric energy within a second preset time period, so that the capacitor C can supply power to the chip 1 through the stored electric energy, and the chip 1 can perform a corresponding operation according to the communication signal and return a corresponding communication signal. For example, if the communication signal received by the vaporizer is a default inhalation parameter reading command, after the vaporizer receives the default inhalation parameter reading command, the capacitor C receives the charging voltage provided by the battery rod to be charged and store electric energy within the second preset time period of the default inhalation parameter reading command, so that the capacitor C can supply power to the chip 1 through the stored electric energy, and the chip 1 can perform a corresponding operation according to the communication signal and return a corresponding communication signal.

The first preset time period is greater than the second preset time period. For example, the first preset time period may be 4*x ms (x is a byte count that needs to be saved, and 4 ms is a time required for saving a single byte), and for example, the second preset time is 1 ms (a time required for processing such as data verification).

In an example, when the communication signal received by the vaporizer is a data storage command and storage data, the communication signal returned by the vaporizer is a data writing completion signal. For example, if the vaporizer receives a current inhalation parameter updating command and an updated current inhalation parameter, after updating the current inhalation parameter, the vaporizer returns a data writing completion signal to the battery rod.

When the communication signal received by the vaporizer is a data read command, the communication signal returned by the vaporizer is a to-be-read data signal. For example, when the vaporizer receives a default inhalation parameter reading command, the vaporizer returns a stored default inhalation parameter to the battery rod.

When the communication signal received by the vaporizer is a common command, the communication signal returned by the vaporizer is a common command. The common command is data or a command sent to the vaporizer by the battery rod.

In an embodiment, when the vaporizer returns a corresponding communication signal, and the communication signal is at a first logic level, the capacitor C can receive the charging voltage provided by the battery rod to be charged and store electric energy within a third preset time period, so that the capacitor C can supply power to the chip 1 through the stored electric energy, and the chip 1 can communicate with the battery rod normally. Specifically, the first logic level is a logic high level "1", that is, if the communication signal returned to the battery rod by the vaporizer has the logic high level "1", the battery rod continuously provides the charging voltage to the capacitor C within the third preset time period through the driving circuit 60, so that the capacitor C is charged and stores electric energy. Specifically, in an embodiment, the third preset time period may be, for example, 10 us to 30 us, where the third preset time period is less than a duration that the communication signal is at the first logic level. It may be understood that the vaporizer can communicate with the battery pole by using a BMC encoding manner. In the BMC encoding manner, a transition from a high level to a low level indicates 1, and a transition from a low level to a high level indicates 0. That is, the battery rod may communicate with the vaporizer by only identifying a jump signal. Therefore, during a period that the vaporizer transmits a BMC encoded high-level signal, the battery rod charges the capacitor C through the driving circuit 60, so that the capacitor C may be charged without hindering communication between the battery rod and the vaporizer.

Specifically, the vaporizer further includes a heating element L. The heating element is connected to the chip 1. When the vaporizer is inhaled, the vaporizer receives a PWM signal of a preset frequency to heat the heating element L, where the preset frequency ranges from 1 kHz to 200 kHz. In a preferred embodiment, the preset frequency is 20 kHz. The capacitor C is charged when the PWM signal is at the first logic level. The capacitor C discharges when the PWM signal is at a second logic level, a maximum charging time of the capacitor C is less than a duration that the PWM signal is at the first logic level, and a minimum discharging time of the capacitor C is greater than a duration that the PWM signal is at the second logic level.

Specifically, a conventional PWM signal period of an electronic vaporization device is 10 ms (100 Hz). When a resistance is very small or power is very small or a voltage is very high, an extreme situation of an extremely small duty cycle may occur. In an extreme condition, the duty cycle is close to 14%, a high-level duration is 1.4 ms, and a low-level duration is 8.6 ms. The driving control circuit 13 and the capacitor C of the vaporizer only have 1.4 ms for charging. When the power supply voltage is relatively low, there is a risk that an operating voltage of the driving control circuit 13 quickly drops to an extreme low voltage, so that a normal operating state of the driving control circuit 13 cannot be maintained to keep the control switching M in the vaporizer turned on.

To resolve the problem, a frequency of the PWM signal may be increased according to the foregoing manner, so that even in a case that the duty cycle is the same, the discharging time of the capacitor C of the driving control circuit 13 of the vaporizer is shortened since a heating period is shortened, so that a voltage fluctuation on two ends of the capacitor C decreases, and the operating voltage of the driving control circuit 13 is stable.

It can be known from a charging formula I*ΔT=ΔU*C=Q of the capacitor C that, ΔT=ΔU·C/I, where I is a current that the battery rod charges the capacitor C through the PWM signal, AU is a voltage difference that the capacitor C is charged from 1.8 V to an operating voltage of the heating element L, C is a capacity of the capacitor C, and ΔT is a charging time of the capacitor C. Considering an actual application, when the current is minimized and the charging voltage difference is maximized, the charging time is maximized. Therefore, provided that the maximum charging time is less than a high level time of the duty cycle, it may be ensured that the capacitor can be fully charged in every period. The minimum discharging current I of the battery rod in current products is 3 A, and AU corresponds to 1.9 V, and ΔTmax=0.63*C. When the capacity C of the capacitor C is 1 uF, ΔTmax=630 ns. When the frequency of the PWM signal corresponds to 200 kHz, even if at the minimum duty cycle, ΔTmax is less than a duration of the logic high level of the PWM signal, which can ensure that the capacitor C in the vaporizer is fully charged.

Similarly, a discharging formula of the capacitor C may also use $$\Delta T = \frac{\Delta V * C}{I},$$

where I is a current consumed by the driving control circuit 13, AU is a voltage difference that the voltage of the capacitor C is discharged to 1.8 V when the capacitor C discharges, C is a capacity of the capacitor C, and ΔT is a discharging time of the capacitor C. Considering an actual application, when the consumed current I is maximized and the discharging voltage difference ΔU is minimized, the discharging time is minimized. Therefore, provided that the minimum time is greater than a low level time of the duty cycle, it may be ensured that the chip 1 operates stably. According to the maximum operating current 50 uA of the chip 1 and the discharging voltage difference 0.3 V, ΔTmin=6000*C. When the capacity C of capacitor C is 1 uF, ΔTmin=6 ms, where the discharging time is greater than a period that the PWM signal operates at 1 kHz, so that a stable operating of the chip 1 may be ensured.

A preset frequency of the PWM signal is preferably 20 kHz, which mainly considers that sampling of the communication port ADC is relatively stable within 50 us.

The vaporizer shown in this embodiment can use a BMC encoding manner to communicate with the battery rod, where in the BMC encoding manner, a transition from a high level to a low level indicates 1, and a transition from a low level to a high level indicates 0. During transmission of a BMC encoded high-level signal, the battery rod charges the capacitor C of the vaporizer through the driving circuit 60 to store electric energy, thereby ensuring a stable voltage of the chip 1 during communication. Specifically, when the chip 1 writes data into the internal memory, a required current is relatively high. In this case, the driving circuit 60 provides a high voltage and a high current to the chip 1 of the vaporizer, which can further ensure a table voltage of the chip 1 during communication. When the vaporizer is inhaled, the vaporizer receives a PWM signal of a preset frequency to heat the heating element L, where the preset frequency ranges from 1 kHz to 200 kHz. In a preferred embodiment, the preset frequency is 20 kHz. In this way, the voltage may be kept stable when the heating element L is heated.

Figure 16:
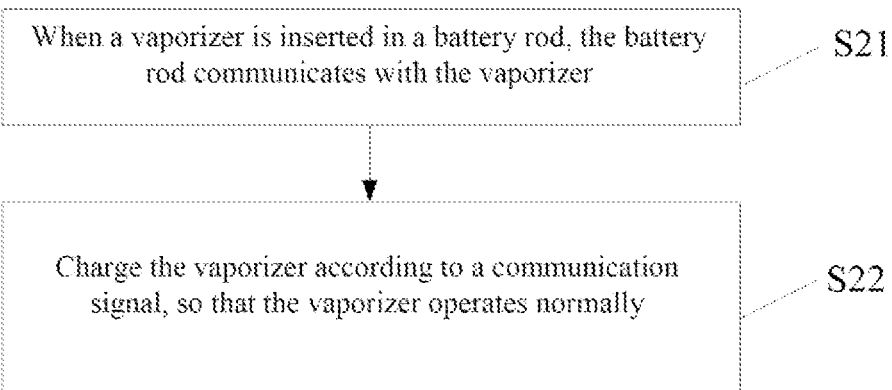
FIG. 16 is a schematic flowchart of an embodiment of a method for using the battery rod in FIG. 14.

FIG. 16 is a schematic flowchart of an embodiment of a method for using the battery rod in FIG. 14. The battery rod is configured to drive a vaporizer that is inserted therein and supply power to the vaporizer. Referring to FIG. 14, the battery rod includes: a driving chip 100 and a driving circuit 60, where the driving circuit 60 is connected to the driving chip 100. The driving chip 100 communicates with the vaporizer inserted therein through the driving circuit 60, and charges a capacitor C in the vaporizer according to a communication signal between the vaporizer and the battery rod, so that the vaporizer operates normally.

Specifically, the method includes:

Step S21: When the vaporizer is inserted in the battery rod, the battery rod communicates with the vaporizer. When the vaporizer is inserted in the battery rod, the battery rod sends a communication signal to the vaporizer through a detection communication port. Specifically, the driving chip 100 further includes a detection communication port P1, and the battery rod includes: an identification circuit 70 and a driving circuit 60, where the identification circuit 70 is connected to the detection communication port P1 and the driving circuit 60. When the vaporizer is inserted in the battery rod, the battery rod sends a communication signal to the vaporizer through the detection communication port P1 or the driving port P2 or P3.

Step S22: Charge the vaporizer according to a communication signal, so that the vaporizer operates normally. Specifically, when the communication signal is a data storage command and storage data, the battery rod provides a charging voltage to the vaporizer within a first preset time period to charge the capacitor C in the vaporizer, and after the vaporizer completes storage of the data normally, the battery rod receives a returned corresponding communication signal.

For example, if the communication signal sent by the battery rod is a command to update a current inhalation parameter in the vaporizer, and the storage data is an updated current inhalation parameter, the vaporizer stores the updated current inhalation parameter according to the data storage command. In this case, during a data storage process, the battery rod provides the charging voltage to the capacitor C within the first preset time period, so that the capacitor C is charged and stores electric energy, and the capacitor C can supply electric energy to the chip 1 through the stored electric energy Therefore, the chip 1 can be supplied with electric energy normally during the data storage process, and return a corresponding communication signal after data storage is completed.

When the chip 1 writes the storage data into an internal memory, a high current is required, for example, 5 mA to 30 mA. In this case, the battery rod continuously provides a high voltage and a high current to the vaporizer. After the chip 1 completes writing of the storage data, the battery rod stops supplying power to the vaporizer, so that the driving control circuit 13 can keep the voltage stable during writing of the storage data.

When the communication signal is a common command or a data reading command, the battery rod provides a charging voltage to the vaporizer within a second preset time period to charge the capacitor C of the vaporizer, and receives a returned corresponding communication signal after the vaporizer performs a corresponding operation according to the communication signal. For example, if the communication signal sent by the battery rod is a default inhalation parameter reading command, after the vaporizer receives the default inhalation parameter reading command, the battery rod provides the charging voltage to the capacitor C within the second preset time period of the default inhalation parameter reading command, so that the capacitor is charged and stores electric energy, and the capacitor C can supply power to the chip 1 through the stored electric energy. Therefore, the chip 1 performs a corresponding operation according to the communication signal and returns a corresponding communication signal.

The first preset time period is greater than the second preset time period. For example, the first preset time period may be 4*x ms (x is a byte count that needs to be saved, and 4 ms is a time required for saving a single byte), and for example, the second preset time is 1 ms (a time required for processing such as data verification).

In an example, when the communication signal sent by the battery rod is a data storage command and storage data, the communication signal returned by the vaporizer is a data writing completion signal. For example, if the communication signal sent by the battery rod is to update a current inhalation parameter and an updated current inhalation parameter, after the vaporizer updates the current inhalation parameter, the battery rod receives a returned data writing completion signal.

When the communication signal sent by the battery rod is a data reading command, a returned response communication signal received by the battery rod is a to-be-read data signal. For example, if the communication signal sent by the battery rod is a default inhalation parameter reading command, the returned response communication signal received by the battery rod is a default inhalation parameter.

When the communication signal sent by the battery rod is a common command, the returned response communication signal received by the battery rod is a common command. The common command is data or a command sent to the vaporizer by the battery rod.

In an embodiment, when the battery rod receives a corresponding communication signal and the communication signal is at a first logic level, the battery rod provides a charging voltage to the vaporizer within a third preset time period to charge the capacitor of the vaporizer. Specifically, the first logic level is a logic high level "1", that is, if the communication signal received by the battery rod has the logic high level "1", the battery rod continuously provides the charging voltage to the capacitor C within the third preset time period through the driving circuit 60, so that the capacitor C is charged and stores electric energy. Specifically, in an embodiment, the third preset time period may be, for example, 10 us to 30 us, and the third preset time period is less than a duration that the communication signal is at the first logic level.

In an embodiment, when the vaporizer is detected to be inhaled, the battery rod sends a PWM signal of a preset frequency to heat the heating element of the vaporizer, where the preset frequency ranges from 1 kHz to 200 kHz. In a preferred embodiment, the preset frequency is 20 kHz. The capacitor C is charged when the PWM signal is at the first logic level. The capacitor C discharges when the PWM signal is at a second logic level, a maximum charging time of the capacitor C is less than a duration that the PWM signal is at the first logic level, and a minimum discharging time of the capacitor C is greater than a duration that the PWM signal is at the second logic level.

Specifically, a conventional PWM signal period of an electronic vaporization device is 10 ms (100 Hz). When a resistance is very small or power is very small or a voltage is very high, an extreme situation of an extremely small duty cycle may occur. In an extreme condition, the duty cycle is close to 14%, a high-level duration is 1.4 ms, and a low-level duration is 8.6 ms. The driving control circuit 13 and the capacitor C of the vaporizer only have 1.4 ms for charging. When the power supply voltage is relatively low, there is a risk that an operating voltage of the driving control circuit 13 quickly drops to an extreme low voltage, so that a normal operating state of the driving control circuit 13 cannot be maintained to keep the control switching M in the vaporizer turned on.

To resolve the problem, a frequency of the PWM signal may be increased according to the foregoing manner, so that even in a case that the duty cycle is the same, the discharging time of the capacitor C of the driving control circuit 13 of the vaporizer is shortened since a heating period is shortened, so that a voltage fluctuation on two ends of the capacitor C decreases, and the operating voltage of the driving control circuit 13 is stable.

It can be known from a charging formula I*ΔT=AU*C=Q of the capacitor C that, $$\Delta T = \frac{\Delta V * C}{I},$$

where I is a current that the battery rod charges the capacitor C through the PWM signal, AU is a voltage difference that the capacitor C is charged from 1.8 V to an operating voltage of the heating element L, C is a capacity of the capacitor C, and ΔT is a charging time of the capacitor C.

Considering an actual application, when the current is minimized and the charging voltage difference is maximized, the charging time is maximized. Therefore, provided that the maximum charging time is less than a high level time of the duty cycle, it may be ensured that the capacitor can be fully charged in every period. The minimum discharging current I of the battery rod in current products is 3 A, and ΔU corresponds to 1.9 V, and ΔTmax=0.63*C. When the capacity C of the capacitor C is 1 uF, ΔTmax=630 ns. When the frequency of the PWM signal corresponds to 200 kHz, even if at the minimum duty cycle, ΔTmax is less than the duration of the logic high level of the PWM signal, which can ensure that the capacitor C in the vaporizer is fully charged.

Similarly, a discharging formula of the capacitor C may also use $$\Delta T = \frac{\Delta V * C}{I},$$

where I is a current consumed by the driving control circuit 13, AU is a voltage difference that the voltage of the capacitor C is discharged to 1.8 V when the capacitor C discharges, C is a capacity of the capacitor C, and ΔT is a discharging time of the capacitor C. Considering an actual application, when the consumed current I is maximized and the discharging voltage difference ΔU is minimized, the discharging time is minimized. Therefore, provided that the minimum time is greater than a low level time of the duty cycle, it may be ensured that the chip 1 operates stably. According to the maximum operating current 50 uA of the chip 1 and the discharging voltage difference 0.3 V, ΔTmin=6000*C. When the capacity C of capacitor C is 1 uF, ΔTmin=6 ms, where the discharging time is greater than a period that the PWM signal operates at 1 kHz, so that a stable operating of the chip 1 may be ensured.

A preset frequency of the PWM signal is preferably 20 kHz, which mainly considers that sampling of the communication port ADC is relatively stable within 50 us.

The vaporizer shown in this embodiment can communicate with the battery rod in a BMC encoding manner. During transmission of a high-level signal, the battery rod charges the capacitor C of the vaporizer through the driving circuit 60 to store electric energy, thereby ensuring a stable voltage of chip 1 during communication. Specifically, when the chip 1 writes data into the internal memory, a required current is relatively high. In this case, the driving circuit 60 provides a high voltage and a high current to the chip 1 of the vaporizer, which can further ensure a table voltage of the chip 1 during communication. When the vaporizer is inhaled, the vaporizer receives a PWM signal of a preset frequency to heat the heating element L, where the preset frequency ranges from 1 kHz to 200 kHz. In a preferred embodiment, the preset frequency is 20 kHz. In this way, the voltage may be kept stable when the heating element L is heated.

In the electronic vaporization device provided in this application, a driving chip and a driving identification circuit are arranged in a battery rod thereof, where the driving identification circuit is connected to the driving chip. When a vaporizer is inserted in the battery rod, the driving chip determines that the vaporizer is forwardly inserted or reversely inserted through the driving identification circuit and controls the driving identification circuit to operate in a forward insertion mode or a reverse insertion mode. In this way, the battery rod and the vaporizer can both operate normally in the forward insertion mode or the reverse insertion mode.

The electronic vaporization device provided in this application can charge a capacitor in the vaporizer through the battery rod, so that the capacitor supplies power to a chip of the vaporizer and ensures a stable voltage of the chip of the vaporizer.

The foregoing descriptions are merely implementations of this application but are not intended to limit the patent scope of this application. Any equivalent structural or equivalent process change made by using the content of the specification and the accompanying drawings of this application for direct or indirect use in other relevant technical fields shall fall within the patent protection scope of this application.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A battery rod configured to drive a vaporizer inserted therein, the battery rod comprising:
a driving chip; and
a driving identification circuit connected to the driving chip,
wherein, when the vaporizer is inserted in the battery rod, the driving chip is configured to determine that the vaporizer is forwardly inserted or reversely inserted through the driving identification circuit and to control the driving identification circuit to operate in a forward insertion mode or a reverse insertion mode,
wherein the driving identification circuit comprises: a direction identification unit, a driving unit, and a power supply switching unit,
wherein the driving chip comprises a detection communication port, a driving port, and a switching port,
wherein the direction identification unit is connected to the detection communication port, the driving unit is connected to the driving port, and the power supply switching unit is connected to the switching port, and
wherein the driving chip is configured to determine that the vaporizer is forwardly inserted or reversely inserted through the detection communication port and the direction identification unit, and to control the power supply switching unit to switch through the switching port such that the driving identification circuit operates in the forward insertion mode or the reverse insertion mode.

2. The battery rod of claim 1, wherein the detection communication port comprises a first detection communication port and a second detection communication port, wherein, when it is determined that the first detection communication port is capable of communicating with the vaporizer, the vaporizer inserted in the battery rod is determined as being forwardly inserted, and
wherein, when it is determined that the second detection communication port is capable of communicating with the vaporizer, the vaporizer inserted in the battery rod is determined as being reversely inserted.

3. The battery rod of claim 1, wherein the detection communication port comprises a first detection communication port and a second detection communication port,
wherein, when it is determined that a resistance value collected by the first detection communication port is in a first preset range, and a resistance value collected by the second detection communication port is in a second preset range, the vaporizer inserted in the battery rod is determined as being forwardly inserted, and
wherein, when it is determined that the resistance value collected by the first detection communication port is in the second preset range, and the resistance value collected by the second detection communication port is in the first preset range, the vaporizer inserted in the battery rod is determined as being reversely inserted.

4. The battery rod of claim 1, further comprising:
a first connection pin and a second connection pin, configured to be electrically connected to the vaporizer inserted in the battery rod,
wherein, when the vaporizer inserted in the battery rod is forwardly inserted, the driving identification circuit operates in the forward insertion mode such that the first connection pin serves as a power supply output end and the second connection pin serves as a ground voltage output end, and
wherein, when the vaporizer inserted in the battery rod is reversely inserted, the driving identification circuit operates in the reverse insertion mode such that the first connection pin serves as the ground voltage output end and the second connection pin serves as the power supply output end.

5. The battery rod of claim 4, wherein the direction identification unit comprises:
a first identification module comprising a first resistor, a first end of the first resistor being connected to a power supply voltage, and a second end of the first resistor being connected to the first detection communication port and the first connection pin; and
a second identification module comprising a second resistor, a first end of the second resistor being connected to the power supply voltage, and a second end of the second resistor being connected to the second detection communication port and the second connection pin.

6. The battery rod of claim 5, wherein the driving unit comprises a first driving module and a second driving module, and the driving port comprises a first group of driving ports and a second group of driving ports, the first driving module being connected to the first group of driving ports and the second driving module being connected to the second group of driving ports,
wherein the power supply switching unit comprises a first switching module and a second switching module, and the switching port comprises a first switching port and a second switching port, the first switching module being connected to the first switching port, the first driving module, and the first connection pin, and the second switching module being connected to the second switching port, the second driving module, and the second connection pin, wherein, when the vaporizer inserted in the battery rod is forwardly inserted, the first switching port and the second switching port are configured to switch the first switching module to a non-operating mode and the second switching module to an operating mode such that the first connection pin is connected to the first driving module and the second connection pin is connected to a ground voltage, and wherein, when the vaporizer inserted in the battery rod is reversely inserted, the first switching port and the second switching port are configured to switch the first switching module to the operating mode and the second switching module to the non-operating mode such that the first connection pin is connected to the ground voltage and the second connection pin is connected to the second driving module.

7. The battery rod of claim 6, wherein the first switching module comprises a first switch, a first channel end thereof is connected to the first connection pin, a second channel end thereof is connected to the ground voltage, and a control end thereof is connected to the first switching port, and wherein the second switching module comprises a second switch, a first channel end thereof is connected to the second connection pin, a second channel end thereof is connected to the ground voltage, and a control end thereof is connected to the second switching port.

8. The battery rod of claim 7, wherein the first group of driving ports comprises a first positive driving port and a second positive driving port, and wherein the first driving module comprises:

a third switch, a first channel end thereof being connected to the power supply voltage, a second channel end thereof being connected to the first connection pin, and a control end thereof being connected to the first positive driving port;

a fourth switch, a first channel end thereof being connected to the power supply voltage and a control end thereof being connected to the second positive driving port; and a third resistor, a first end thereof being connected to a second channel end of the fourth switch and a second end thereof being connected to the first detection communication port and the first connection pin, and wherein the second group of driving ports comprises a first negative driving port and a second negative driving port, and wherein the second driving module comprises:

a fifth switch, a first channel end thereof being connected to the power supply voltage, a second channel end thereof being connected to the second connection pin, and a control end thereof being connected to the first negative driving port;

a sixth switch, a first channel end thereof being connected to the power supply voltage and a control end thereof being connected to the second negative driving port; and a fourth resistor, a first end thereof being connected to a second channel end of the sixth switch and a second end thereof being connected to the second detection communication port and the second connection pin.

9. The battery rod of claim 5, wherein the switching port comprises a first switching port and a second switching port, wherein the power supply switching unit is connected between an output end of the driving unit and a ground voltage, and the power supply switching unit is connected to the first switching port, the second switching port, the first connection pin, and the second connection pin, wherein, when the vaporizer inserted in the battery rod is forwardly inserted, the first switching port and the second switching port are configured to switch the power supply switching unit to operate in a first mode such that the first connection pin is connected to the output end of the driving unit and the second connection pin is connected to the ground voltage, and wherein, when the vaporizer inserted in the battery rod is reversely inserted, the first switching port and the second switching port are configured to switch the power supply switching unit to operate in a second mode such that the first connection pin is connected to the ground voltage and the second connection pin is connected to the output end of the driving unit.

10. The battery rod of claim 9, wherein the power supply switching unit comprises:

a first switching module and a second switching module, the first switching module being connected to the first switching port and the first connection pin and configured to be connected to the ground voltage, the second switching module being connected to the second switching port and the second connection pin and configured to be connected to the ground voltage, wherein, when the vaporizer inserted in the battery rod is forwardly inserted, the first switching port is configured to switch the first switching module to be connected to the output end of the driving unit, and the second switching port is configured to switch the second switching module to be connected to the ground voltage, and wherein, when the vaporizer inserted in the battery rod is reversely inserted, the first switching port is configured to switch the first switching module to be connected to the ground voltage and the second switching port is configured to switch the second switching module to be connected to the output end of the driving unit.

11. The battery rod of claim 10, wherein the first switching module comprises:

a fifth resistor, a first end thereof being connected to the output end of the driving unit;

a first capacitor, a first end thereof being connected to the output end of the driving unit and a second end thereof being connected to a second end of the fifth resistor;

a first diode, a first end thereof being connected to the second end of the fifth resistor and a second end thereof being connected to the first switching port;

a seventh switch, a first channel end thereof being connected to the output end of the driving unit, a second channel end thereof being connected to the first connection pin, and a control end thereof being connected to the second end of the fifth resistor; and an eighth switch, a first channel end thereof being connected to the first connection pin, a second channel end thereof being connected to the ground voltage, and a control end thereof being connected to the first switching port, and wherein the second switching module comprises:

a sixth resistor, a first end thereof being connected to the output end of the driving unit;

a second capacitor, a first end thereof being connected to the output end of the driving unit and a second end thereof being connected to a second end of the sixth resistor;

a second diode, a first end thereof being connected to the second end of the sixth resistor and a second end thereof being connected to the second switching port;

a ninth switch, a first channel end thereof being connected to the output end of the driving unit, a second channel end thereof being connected to the second connection pin, and a control end thereof being connected to the second end of the sixth resistor; and a tenth switch, a first channel end thereof being connected to the second connection pin, a second channel end thereof being connected to the ground voltage, and a control end thereof being connected to the second switching port.

12. The battery rod of claim 9, wherein the driving port comprises a first driving port and a second driving port; and wherein the driving unit comprises:

an eleventh switch, a first channel end thereof being connected to the power supply voltage, a second channel end thereof being connected to the output end of the driving unit, and a control end thereof being connected to the first driving port;

a twelfth switch, a first channel end thereof being connected to the power supply voltage and a control end thereof being connected to the second driving port; and a seventh resistor, a first end thereof being connected to a second channel end of the twelfth switch and a second end thereof being connected to the output end of the driving unit.

13. An electronic vaporization device, comprising:

the battery rod of claim 1; and the vaporizer, wherein the battery rod is configured to drive the vaporizer inserted therein.

14. A battery rod configured to drive a vaporizer inserted therein, the battery rod comprising:

a driving chip;

a driving identification circuit connected to the driving chip; and a first connection pin and a second connection pin, configured to be electrically connected to the vaporizer inserted in the battery rod, wherein, when the vaporizer is inserted in the battery rod, the driving chip is configured to determine that the vaporizer is forwardly inserted or reversely inserted through the driving identification circuit and to control the driving identification circuit to operate in a forward insertion mode or a reverse insertion mode, wherein, when the vaporizer inserted in the battery rod is forwardly inserted, the driving identification circuit operates in the forward insertion mode such that the first connection pin serves as a power supply output end and the second connection pin serves as a ground voltage output end, and wherein, when the vaporizer inserted in the battery rod is reversely inserted, the driving identification circuit operates in the reverse insertion mode such that the first connection pin serves as the ground voltage output end and the second connection pin serves as the power supply output end.

15. The battery rod of claim 14, wherein the direction identification unit comprises:

a first identification module comprising a first resistor, a first end of the first resistor being connected to a power supply voltage, and a second end of the first resistor being connected to the first detection communication port and the first connection pin; and a second identification module comprising a second resistor, a first end of the second resistor being connected to the power supply voltage, and a second end of the second resistor being connected to the second detection communication port and the second connection pin.

16. The battery rod of claim 15, wherein the driving unit comprises a first driving module and a second driving module, and the driving port comprises a first group of driving ports and a second group of driving ports, the first driving module being connected to the first group of driving ports and the second driving module being connected to the second group of driving ports, wherein the power supply switching unit comprises a first switching module and a second switching module, and the switching port comprises a first switching port and a second switching port, the first switching module being connected to the first switching port, the first driving module, and the first connection pin, and the second switching module being connected to the second switching port, the second driving module, and the second connection pin, wherein, when the vaporizer inserted in the battery rod is forwardly inserted, the first switching port and the second switching port are configured to switch the first switching module to a non-operating mode and the second switching module to an operating mode such that the first connection pin is connected to the first driving module and the second connection pin is connected to a ground voltage, and wherein, when the vaporizer inserted in the battery rod is reversely inserted, the first switching port and the second switching port are configured to switch the first switching module to the operating mode and the second switching module to the non-operating mode such that the first connection pin is connected to the ground voltage and the second connection pin is connected to the second driving module.

17. The battery rod of claim 16, wherein the first switching module comprises a first switch, a first channel end thereof is connected to the first connection pin, a second channel end thereof is connected to the ground voltage, and a control end thereof is connected to the first switching port, and wherein the second switching module comprises a second switch, a first channel end thereof is connected to the second connection pin, a second channel end thereof is connected to the ground voltage, and a control end thereof is connected to the second switching port.

18. The battery rod of claim 17, wherein the first group of driving ports comprises a first positive driving port and a second positive driving port, and wherein the first driving module comprises:

a third switch, a first channel end thereof being connected to the power supply voltage, a second channel end thereof being connected to the first connection pin, and a control end thereof being connected to the first positive driving port;

a fourth switch, a first channel end thereof being connected to the power supply voltage and a control end thereof being connected to the second positive driving port; and a third resistor, a first end thereof being connected to a second channel end of the fourth switch and a second end thereof being connected to the first detection communication port and the first connection pin, and

wherein the second group of driving ports comprises a first negative driving port and a second negative driving port, and wherein the second driving module comprises:

a fifth switch, a first channel end thereof being connected to the power supply voltage, a second channel end thereof being connected to the second connection pin, and a control end thereof being connected to the first negative driving port;

a sixth switch, a first channel end thereof being connected to the power supply voltage and a control end thereof being connected to the second negative driving port; and a fourth resistor, a first end thereof being connected to a second channel end of the sixth switch and a second end thereof being connected to the second detection communication port and the second connection pin.

19. The battery rod of claim 15, wherein the switching port comprises a first switching port and a second switching port, wherein the power supply switching unit is connected between an output end of the driving unit and a ground voltage, and the power supply switching unit is connected to the first switching port, the second switching port, the first connection pin, and the second connection pin, wherein, when the vaporizer inserted in the battery rod is forwardly inserted, the first switching port and the second switching port are configured to switch the power supply switching unit to operate in a first mode such that the first connection pin is connected to the output end of the driving unit and the second connection pin is connected to the ground voltage, and wherein, when the vaporizer inserted in the battery rod is reversely inserted, the first switching port and the second switching port are configured to switch the power supply switching unit to operate in a second mode such that the first connection pin is connected to the ground voltage and the second connection pin is connected to the output end of the driving unit.

20. The battery rod of claim 19, wherein the power supply switching unit comprises:

a first switching module and a second switching module, the first switching module being connected to the first switching port and the first connection pin and configured to be connected to the ground voltage, the second switching module being connected to the second switching port and the second connection pin and configured to be connected to the ground voltage, wherein, when the vaporizer inserted in the battery rod is forwardly inserted, the first switching port is configured to switch the first switching module to be connected to the output end of the driving unit, and the second switching port is configured to switch the second switching module to be connected to the ground voltage, and wherein, when the vaporizer inserted in the battery rod is reversely inserted, the first switching port is configured to switch the first switching module to be connected to the ground voltage and the second switching port is configured to switch the second switching module to be connected to the output end of the driving unit.

* * * * *